(12) United States Patent
Kaga et al.

(10) Patent No.: US 8,117,419 B2
(45) Date of Patent: Feb. 14, 2012

(54) STORAGE APPARATUS AND METHOD FOR ELIMINATING REDUNDANT DATA STORAGE USING STORAGE APPARATUS

(75) Inventors: Takashi Kaga, Odawara (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 12/310,164

(22) PCT Filed: Feb. 4, 2009

(86) PCT No.: PCT/JP2009/000429
§ 371 (c)(1),
(2), (4) Date: Feb. 13, 2009

(87) PCT Pub. No.: WO2010/089797
PCT Pub. Date: Aug. 12, 2010

(65) Prior Publication Data
US 2010/0262777 A1    Oct. 14, 2010

(51) Int. Cl.
*G06F 12/00*    (2006.01)
(52) U.S. Cl. ......................... 711/203; 711/154
(58) Field of Classification Search .................. 711/154, 711/202, 203
See application file for complete search history.

(56) References Cited

U.S. PATENT DOCUMENTS

| | | |
|---|---|---|
| 2006/0236054 A1 | 10/2006 | Kitamura |
| 2006/0282641 A1 | 12/2006 | Fujimoto et al. |
| 2007/0233993 A1 | 10/2007 | Kato et al. |
| 2008/0147961 A1* | 6/2008 | Seki et al. .................. 711/100 |
| 2008/0229118 A1* | 9/2008 | Kasako et al. .............. 713/193 |

FOREIGN PATENT DOCUMENTS

| | | |
|---|---|---|
| EP | 1 857 918 A2 | 11/2007 |
| JP | 07-319897 | 5/1994 |
| JP | 2003-308232 | 4/2002 |
| JP | 2006-350418 | 6/2005 |
| JP | 2007-265270 | 3/2006 |

OTHER PUBLICATIONS

International Search report in PCT/JP2009/000429 mailed on Oct. 6, 2009.

* cited by examiner

*Primary Examiner* — Reba I Elmore
(74) *Attorney, Agent, or Firm* — Stites & Harbison, PLLC; Juan Carlos A. Marquez, Esq.

(57) ABSTRACT

A storage apparatus provides, in a dynamic provisioning system, a virtual logical device (DP-LDEV) that is a virtual logical device configured of a real logical device (N-LDEV). In the storage apparatus, a storage area of a real logical device is managed by being divided into unit cache areas (SLCBs), which are predetermined management units. A storage area of a virtual logical device is managed by being divided into virtual unit areas (PSCBs), which are predetermined management units. Multiple virtual unit areas having the same data stored therein are made to correspond to the same unit cache area, and thereby data stored in a storage device is managed. The correspondence is established with at the timing of, for example, destaging data from a cache memory.

8 Claims, 40 Drawing Sheets

[Fig. 1A]
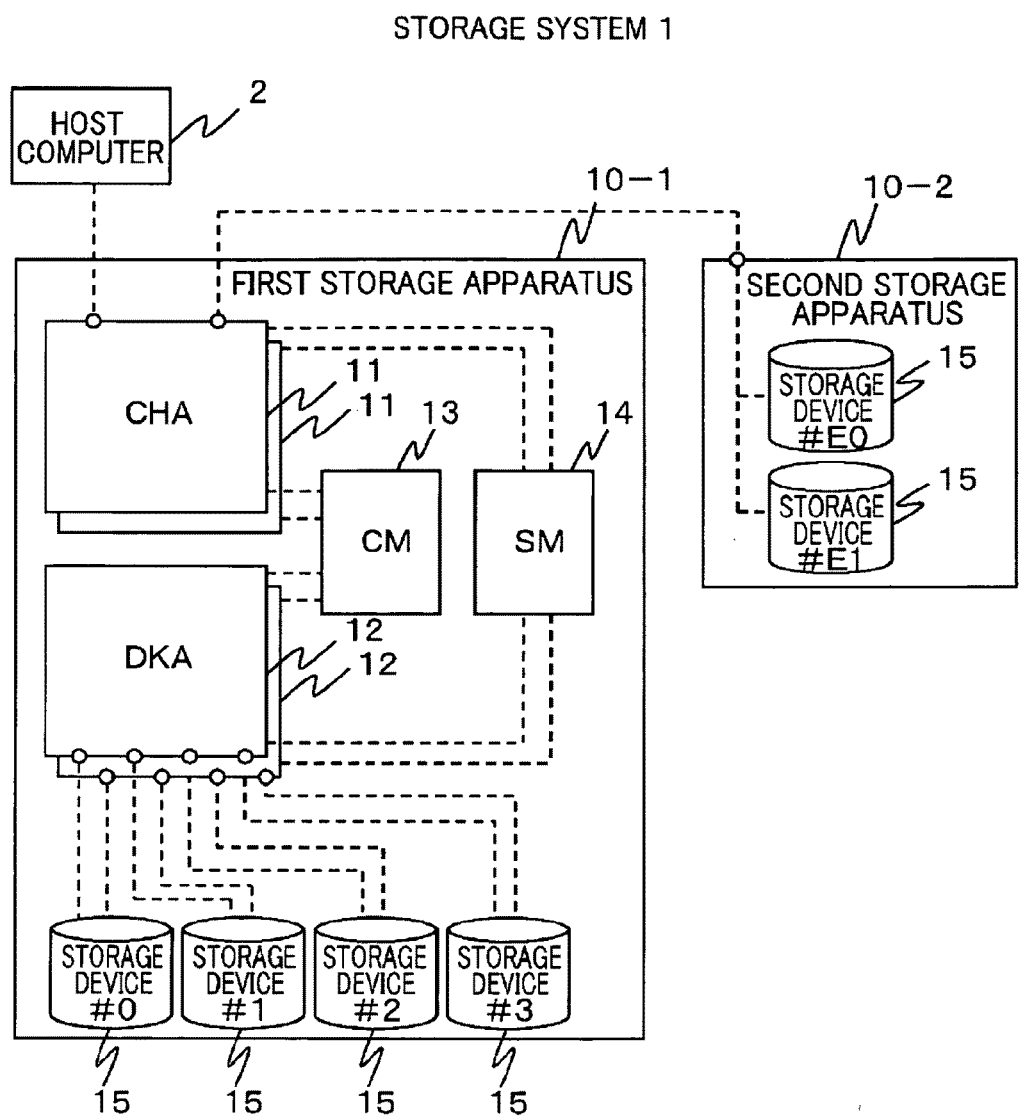

[Fig. 1B]
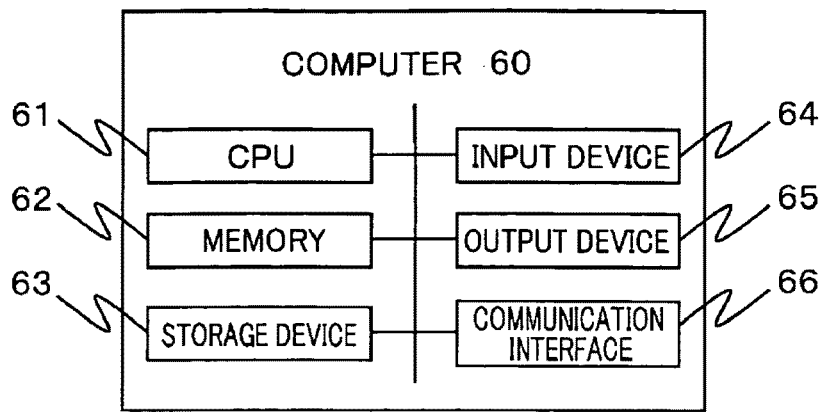
[Fig. 1C]
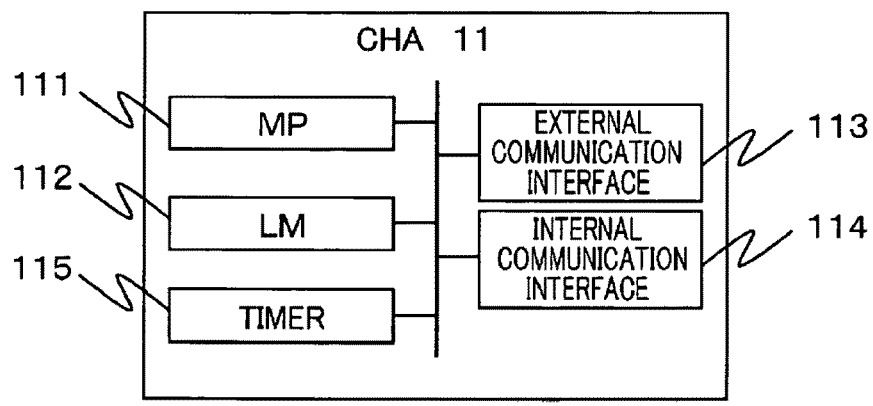
[Fig. 1D]
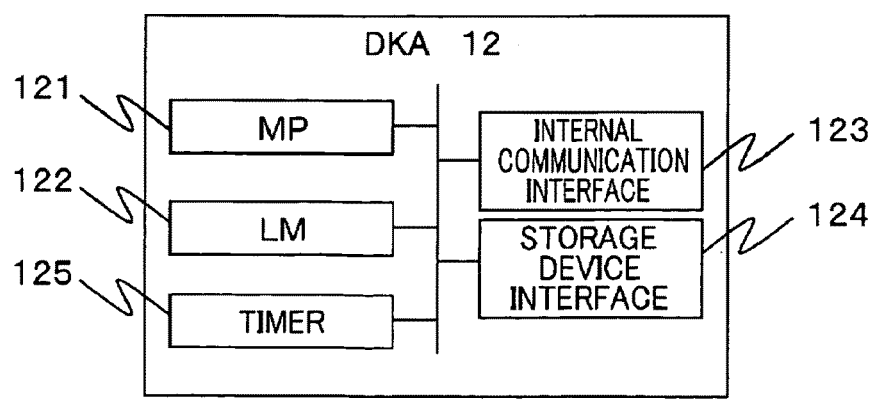

[Fig. 2]
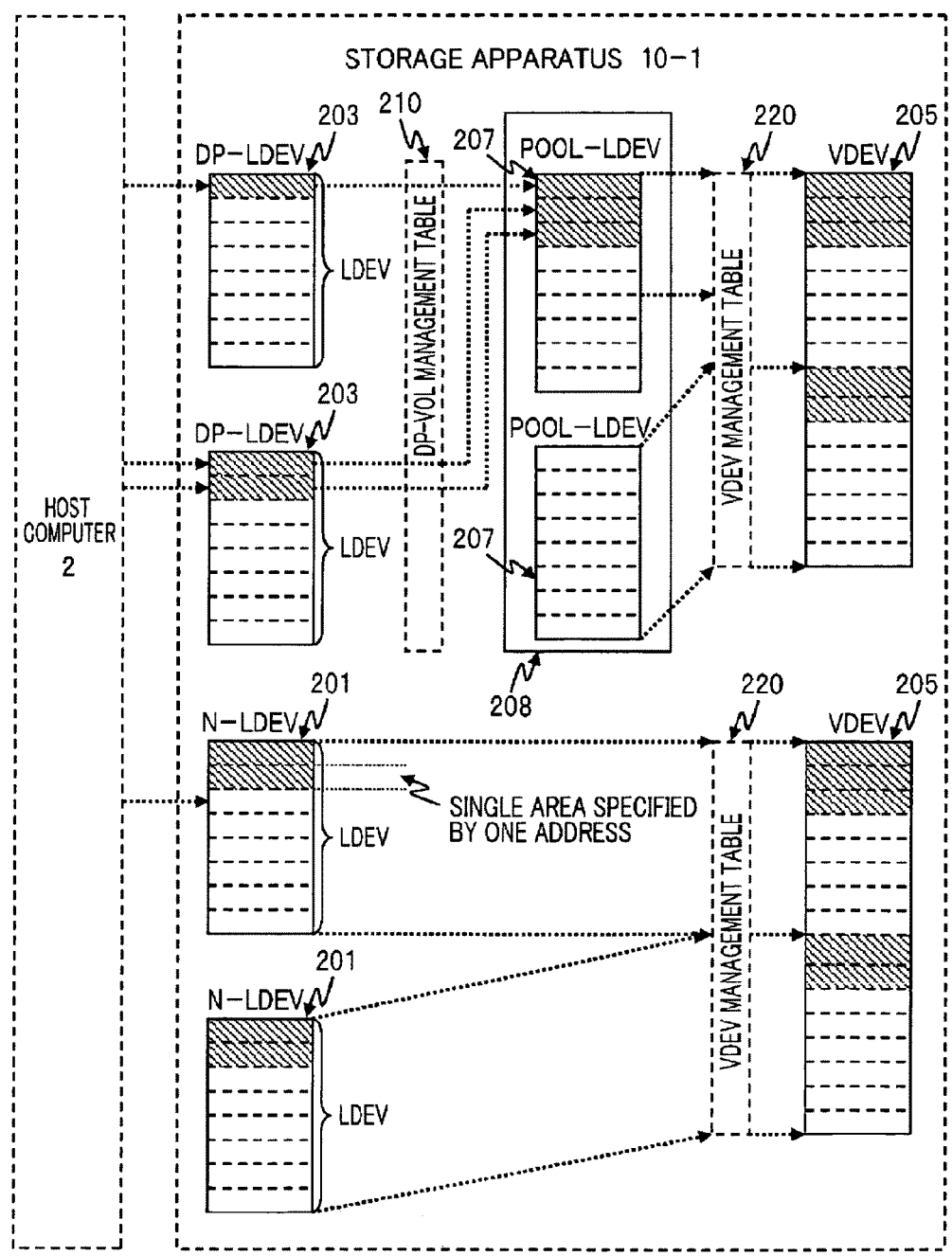

[Fig. 3A]
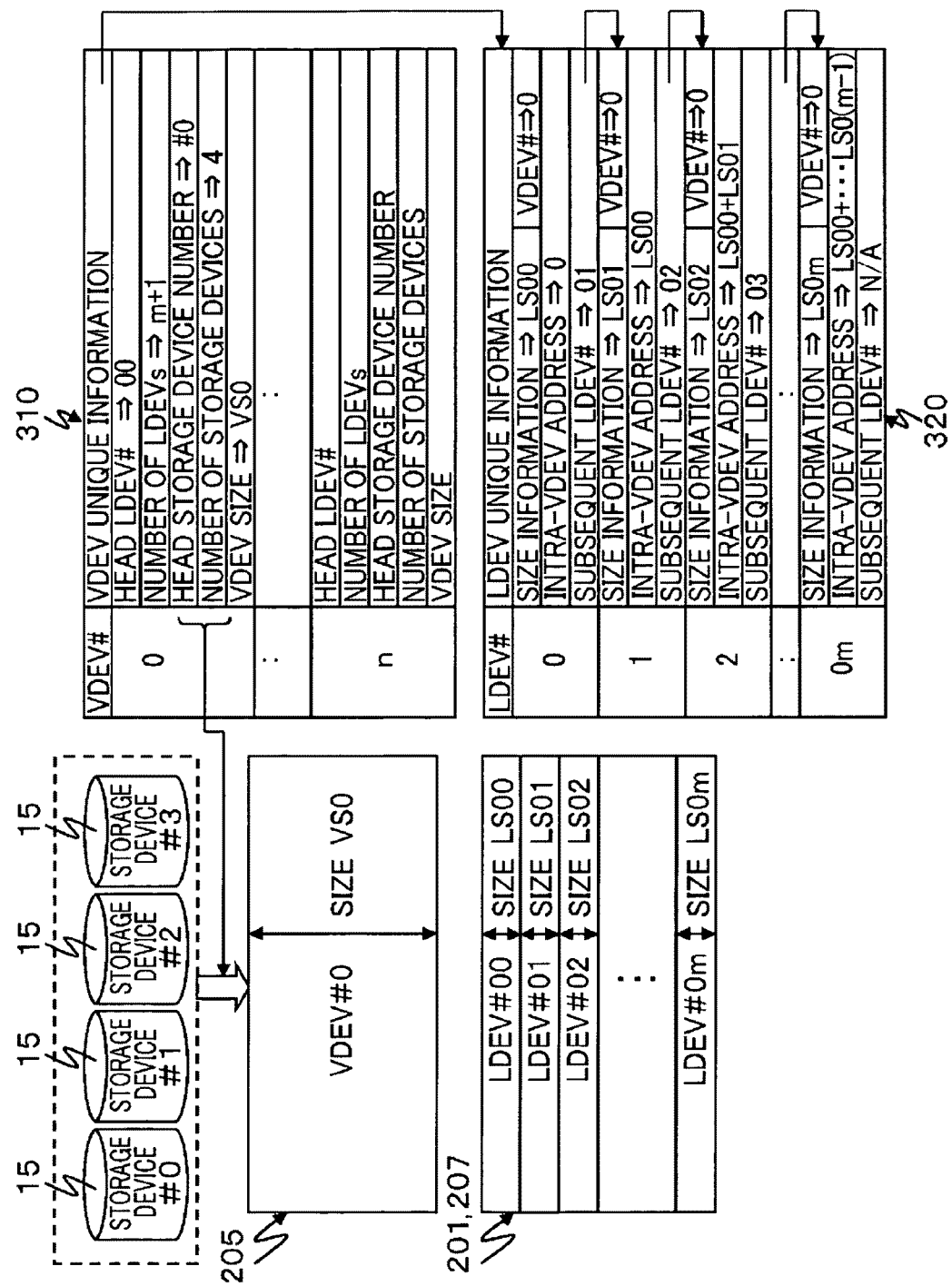

[Fig. 3B]
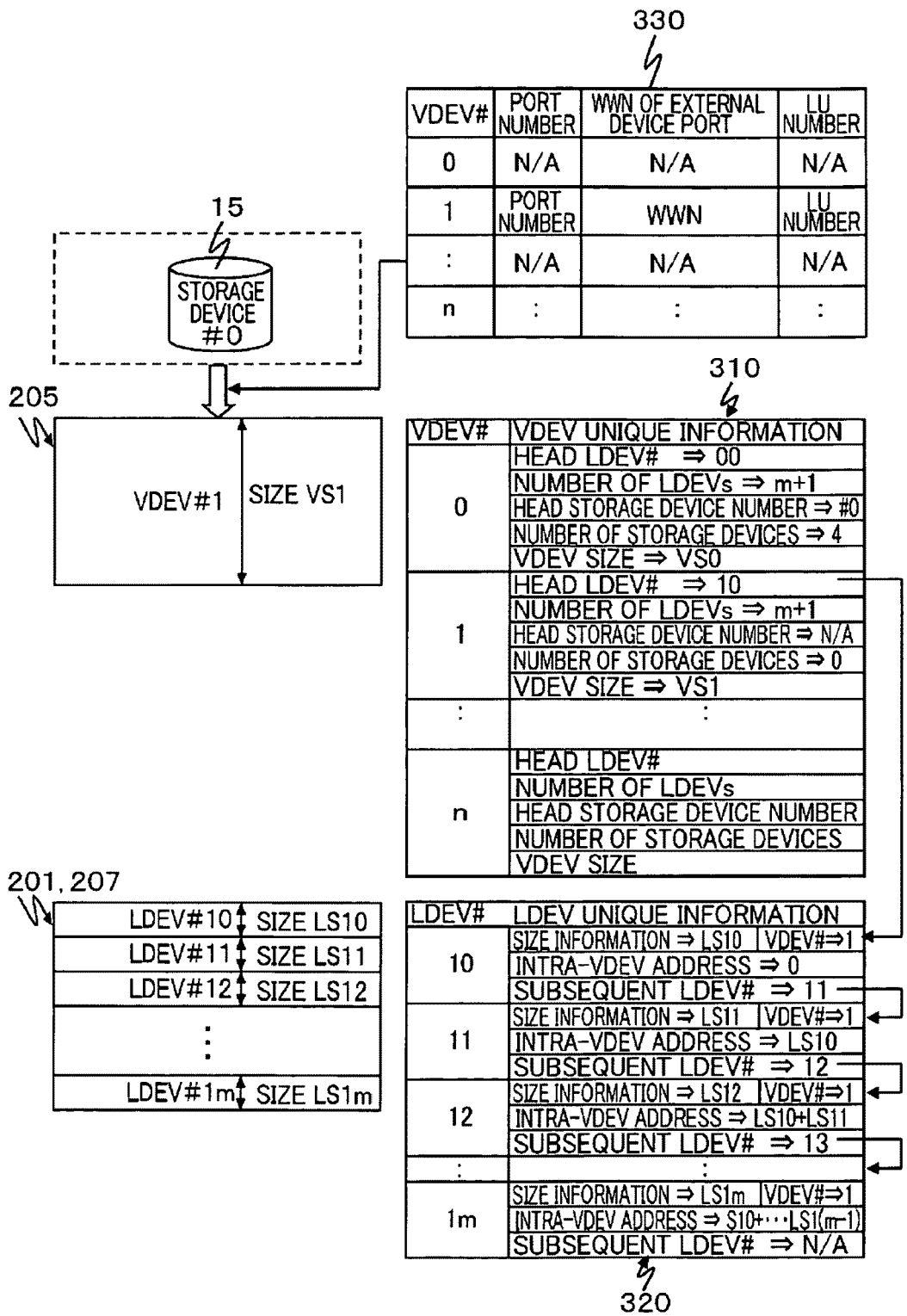

[Fig. 3C]
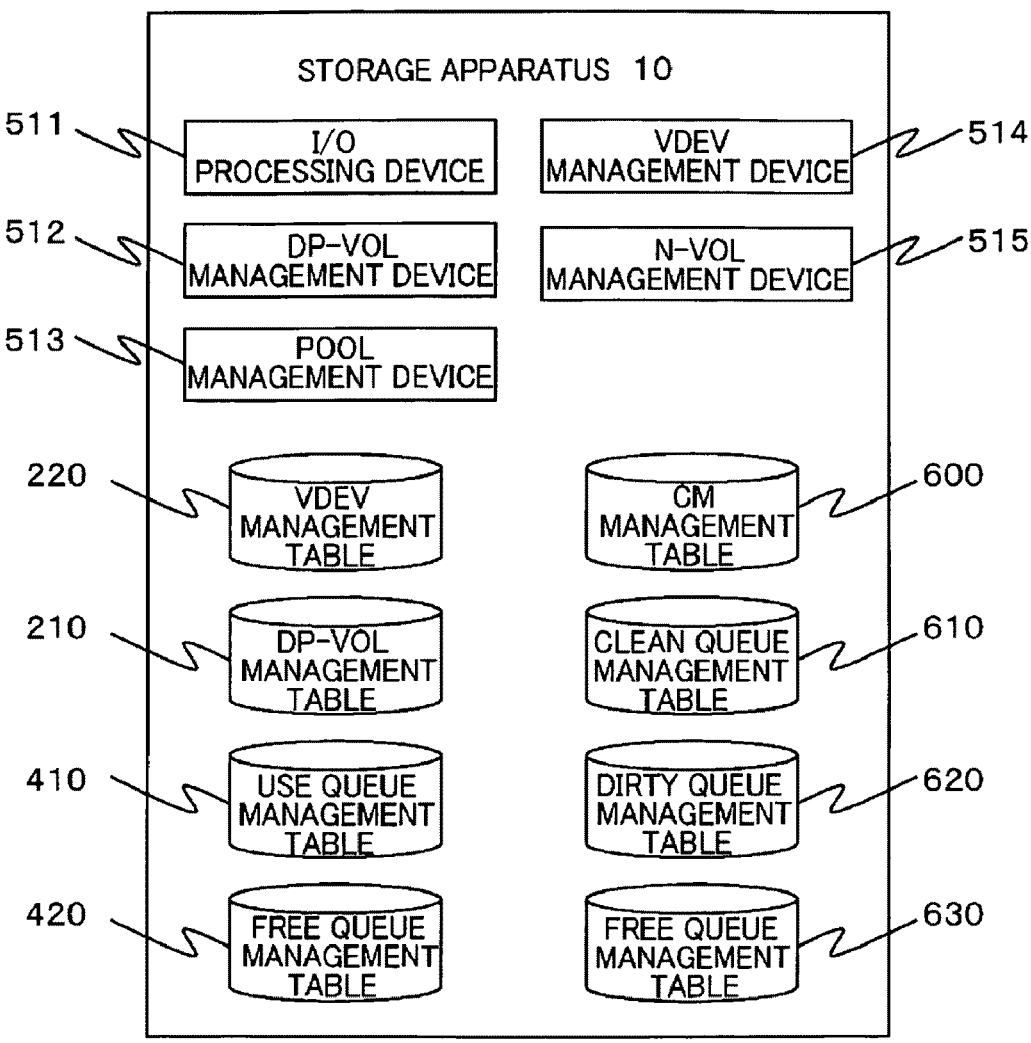

[Fig. 4A]

DP-VOL MANAGEMENT TABLE 210

SECOND TABLE 212

| PSCB# | SUBSEQUENT PSCB# | PRECEDING PSCB# | POOL-LDEV# | START POSITION | NUMBER OF LINKS |
|---|---|---|---|---|---|
| 0 | 1 | N/A | 0 | 0 | 1 |
| 1 | 2 | 0 | 0 | 4 | 1 |
| 2 | 3 | 1 | 0 | 8 | 1 |
| 3 | 4 | 2 | 0 | 12 | 1 |
| 4 | N/A | 3 | 0 | 16 | 1 |
| 5 | 6 | N/A | 0 | 20 | 0 |
| 6 | 7 | 5 | 0 | 24 | 0 |
| ... | ... | ... | ... | ... | ... |
| 100 | 101 | 99 | 1 | 0 | 0 |
| 101 | 102 | 100 | 1 | 4 | 0 |
| 102 | 103 | 101 | 1 | 8 | 0 |
| 103 | 104 | 102 | 1 | 12 | 0 |
| 104 | 105 | 103 | 1 | 16 | 0 |
| ... | ... | ... | ... | ... | ... |
| mm | N/A | mm-1 | pp | xxxxx | 0 |

2121, 2122, 2123, 2124, 2125, 2126

FIRST TABLE 211

| DP-LDEV# | START POSITION | PSCB# |
|---|---|---|
| 0 | 0 | 0 |
| 0 | 4 | 1 |
| 0 | 8 | 2 |
| 0 | 12 | 3 |
| ... | ... | N/A |
| 1 | 0 | N/A |
| 1 | 4 | 4 |
| 1 | 8 | N/A |
| 1 | 12 | ... |

USE QUEUE MANAGEMENT TABLE 410

| HEAD PSCB# | END PSCB# |
|---|---|
| 0 | 4 |
| 4101 | 4102 |

[Fig. 4C]

FREE QUEUE MANAGEMENT TABLE 420

| HEAD PSCB# | END PSCB# |
|---|---|
| 5 | mm |
| 4201 | 4202 |

[Fig. 5A]

DP-VOL MANAGEMENT TABLE 210

FIRST TABLE 211

| DP-LDEV# (2111) | START POSITION (2112) | PSCB# (2113) |
|---|---|---|
| 0 | 0 | 0 |
| 0 | 4 | 1 |
| 0 | 8 | 2 |
| 0 | 12 | 3 |
| ... | ... | N/A |
| ... | ... | N/A |
| 1 | 0 | 4 |
| 1 | 4 | 5 |
| 1 | 8 | ... |
| 1 | 12 | ... |

SECOND TABLE 212

| PSCB# (2121) | SUBSEQUENT PSCB# (2122) | PRECEDING PSCB# (2123) | POOL-LDEV# (2124) | START POSITION (2125) | NUMBER OF LINKS (2126) |
|---|---|---|---|---|---|
| 0 | 1 | N/A | 0 | 0 | |
| 1 | 2 | 0 | 0 | 4 | |
| 2 | 3 | 1 | 0 | 8 | |
| 3 | 4 | 2 | 0 | 12 | |
| 4 | N/A | 3 | 0 | 16 | |
| 5 | 6 | N/A | 0 | 20 | 0 |
| 6 | 7 | 5 | ... | 24 | 0 |
| ... | ... | ... | ... | ... | ... |
| 100 | 101 | 99 | 1 | 0 | 0 |
| 101 | 102 | 100 | 1 | 4 | 0 |
| 102 | 103 | 101 | 1 | 8 | 0 |
| 103 | 104 | 102 | 1 | 12 | 0 |
| 104 | 105 | 103 | 1 | 16 | 0 |
| mm | N/A | mm-1 | pp | xxxxx | 0 |

[Fig. 5B]

USE QUEUE MANAGEMENT TABLE 410

| HEAD PSCB# | END PSCB# |
|---|---|
| 0 | 5 |
| 4101 | 4102 |

[Fig. 5C]

FREE QUEUE MANAGEMENT TABLE 420

| HEAD PSCB# | END PSCB# |
|---|---|
| 6 | mm |
| 4201 | 4202 |

[Fig. 6A]

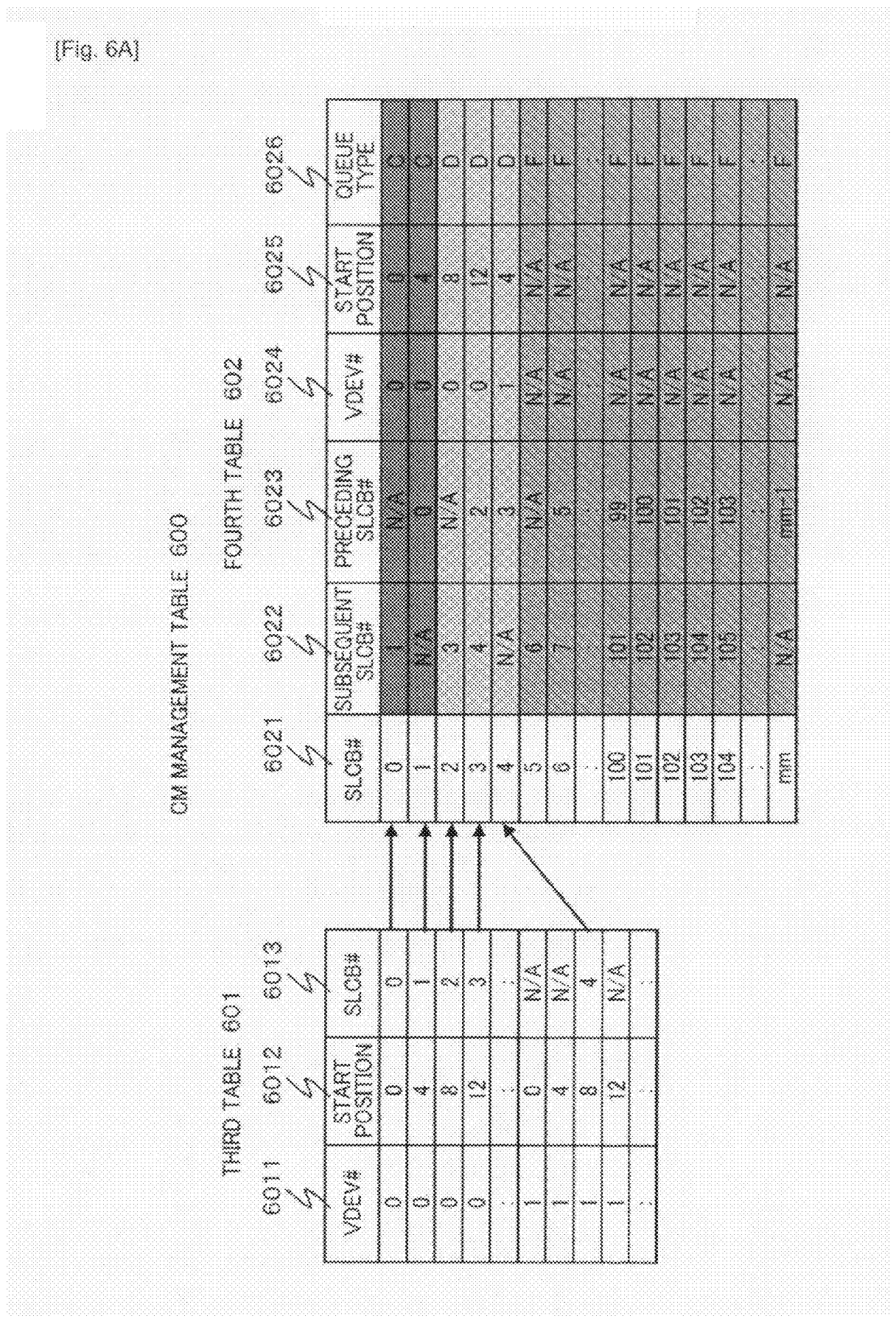

CM MANAGEMENT TABLE 600

THIRD TABLE 601

| VDEV# (6011) | START POSITION (6012) | SLOB# (6013) |
|---|---|---|
| 0 | 0 | 0 |
| 0 | 4 | 1 |
| 0 | 8 | 2 |
| 0 | 12 | 3 |
| 1 | 0 | N/A |
| 1 | 4 | N/A |
| 1 | 8 | 4 |
| 1 | 12 | N/A |
| ... | ... | ... |

FOURTH TABLE 602

| SLOB# (6021) | SUBSEQUENT SLOB# (6022) | PRECEDING SLOB# (6023) | VDEV# (6024) | START POSITION (6025) | QUEUE TYPE (6026) |
|---|---|---|---|---|---|
| 0 | N/A | N/A | 0 | 0 | C |
| 1 | 3 | N/A | 0 | 4 | D |
| 2 | 4 | 2 | 0 | 8 | D |
| 3 | N/A | 2 | 0 | 12 | D |
| 4 | N/A | 3 | 1 | 4 | D |
| 5 | 6 | N/A | N/A | N/A | F |
| 6 | 7 | 5 | N/A | N/A | F |
| 100 | 101 | 99 | N/A | N/A | F |
| 101 | 102 | 100 | N/A | N/A | F |
| 102 | 103 | 101 | N/A | N/A | F |
| 103 | 104 | 102 | N/A | N/A | F |
| 104 | 105 | 103 | N/A | N/A | F |
| mmm | ... | ... | N/A | N/A | F |

[Fig. 6B]
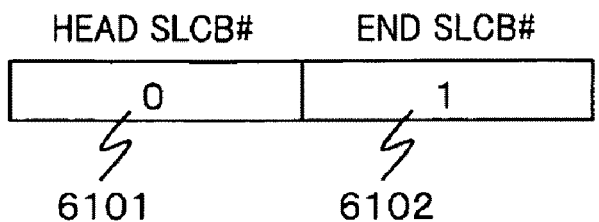
[Fig. 6C]
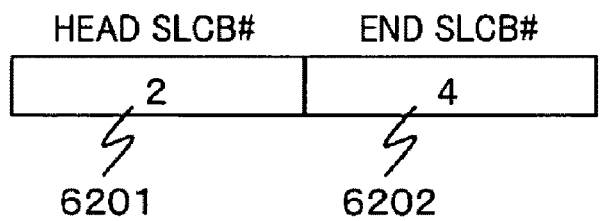
[Fig. 6D]
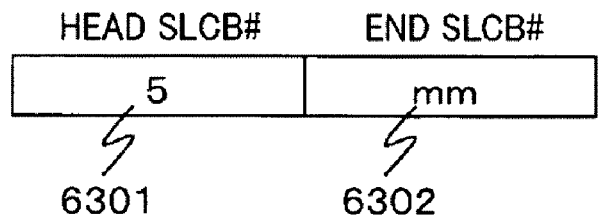

[Fig. 7A]

CM MANAGEMENT TABLE 600

FOURTH TABLE 602

| SLCB# 6021 | SUBSEQUENT SLCB# 6022 | PRECEDING SLCB# 6023 | VDEV# 6024 | START POSITION 6025 | QUEUE TYPE 6026 |
|---|---|---|---|---|---|
| 0 | N/A | 4 | 0 | 0 | D |
| 1 | N/A | N/A | 0 | 4 | D |
| 2 | 3 | N/A | 0 | 8 | D |
| 3 | 4 | 2 | 0 | 12 | D |
| 4 | 0 | 3 | 1 | 4 | D |
| 5 | 6 | N/A | N/A | N/A | F |
| 6 | 7 | 5 | N/A | N/A | F |
| ... | ... | ... | ... | ... | ... |
| 100 | 101 | 99 | N/A | N/A | F |
| 101 | 102 | 100 | N/A | N/A | F |
| 102 | 103 | 101 | N/A | N/A | F |
| 103 | 104 | 102 | N/A | N/A | F |
| 104 | 105 | 103 | N/A | N/A | F |
| ... | ... | ... | ... | ... | ... |
| mm | N/A | mm-1 | N/A | N/A | F |

THIRD TABLE 601

| VDEV# 6011 | START POSITION 6012 | SLCB# 6013 |
|---|---|---|
| 0 | 0 | 0 |
| 0 | 4 | 1 |
| 0 | 8 | 2 |
| 0 | 12 | 3 |
| ... | ... | ... |
| 1 | 0 | N/A |
| 1 | 4 | N/A |
| 1 | 8 | 4 |
| 1 | 12 | N/A |
| ... | ... | ... |

[Fig. 7B]

CLEAN QUEUE MANAGEMENT TABLE 610

| HEAD SLCB# | END SLCB# |
|---|---|
| 1 | 1 |
| 6101 | 6102 |

[Fig. 7C]

DIRTY QUEUE MANAGEMENT TABLE 620

| HEAD SLCB# | END SLCB# |
|---|---|
| 2 | 0 |
| 6201 | 6202 |

[Fig. 7D]

FREE QUEUE MANAGEMENT TABLE 630

| HEAD SLCB# | END SLCB# |
|---|---|
| 5 | mm |
| 6301 | 6302 |

[Fig. 8A]

CM MANAGEMENT TABLE 600

FOURTH TABLE 602

| SLCB# 6021 | SUBSEQUENT SLCB# 6022 | PRECEDING SLCB# 6023 | VDEV# 6024 | START POSITION 6025 | QUEUE TYPE 6026 |
|---|---|---|---|---|---|
| N/A | 4 | 0 | 0 | 0 | D |
| 2 | N/A | 0 | 4 | 0 | D |
| 3 | N/A | 0 | 8 | 0 | D |
| 4 | 2 | 0 | 12 | 0 | D |
| 0 | 3 | 1 | 4 | N/A | D |
| 5 | N/A | 1 | N/A | F | F |
| 7 | 99 | N/A | N/A | F | F |
| 101 | 98 | N/A | N/A | F | F |
| 102 | 100 | N/A | N/A | F | F |
| 103 | 101 | N/A | N/A | F | F |
| 104 | 102 | N/A | N/A | F | F |
| 105 | 103 | N/A | N/A | F | F |
| N/A | m-1 | N/A | N/A | F | F |

THIRD TABLE 601

| VDEV# 6011 | START POSITION 6012 | SLCB# 6013 |
|---|---|---|
| 0 | 0 | 0 |
| 0 | 4 | 1 |
| 0 | 8 | 2 |
| 0 | 12 | 3 |
| ... | ... | N/A |
| 1 | 0 | N/A |
| 1 | 4 | 4 |
| 1 | 8 | 5 |
| 1 | 12 | ... |

[Fig. 8B]
CLEAN QUEUE MANAGEMENT TABLE 610
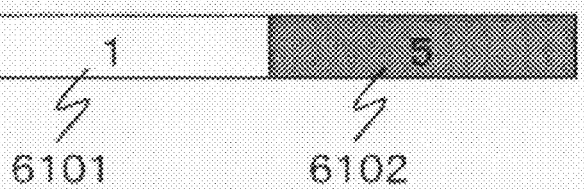
6101    6102
[Fig. 8C]
DIRTY QUEUE MANAGEMENT TABLE 620
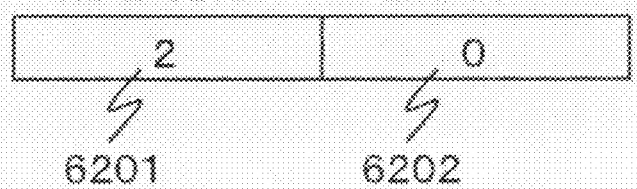
6201    6202
[Fig. 8D]
FREE QUEUE MANAGEMENT TABLE 630
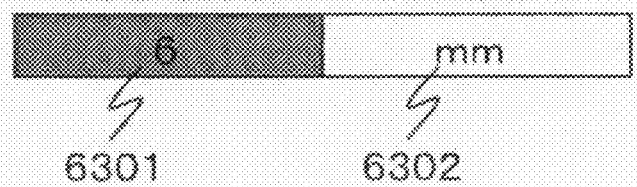
6301    6302

[Fig. 9A]

[Fig. 9B]
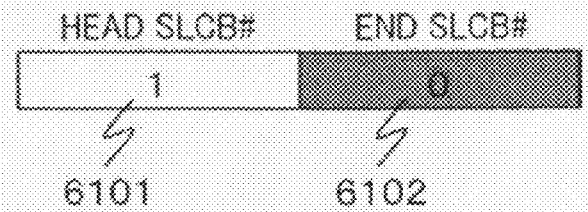
[Fig. 9C]
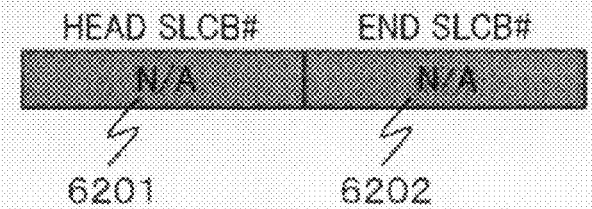
[Fig. 9D]
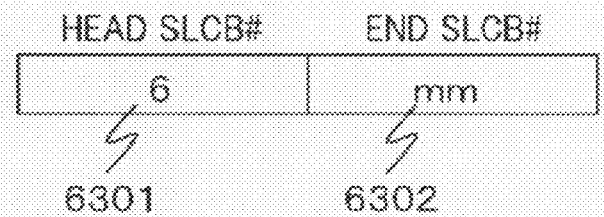

[Fig. 10A]

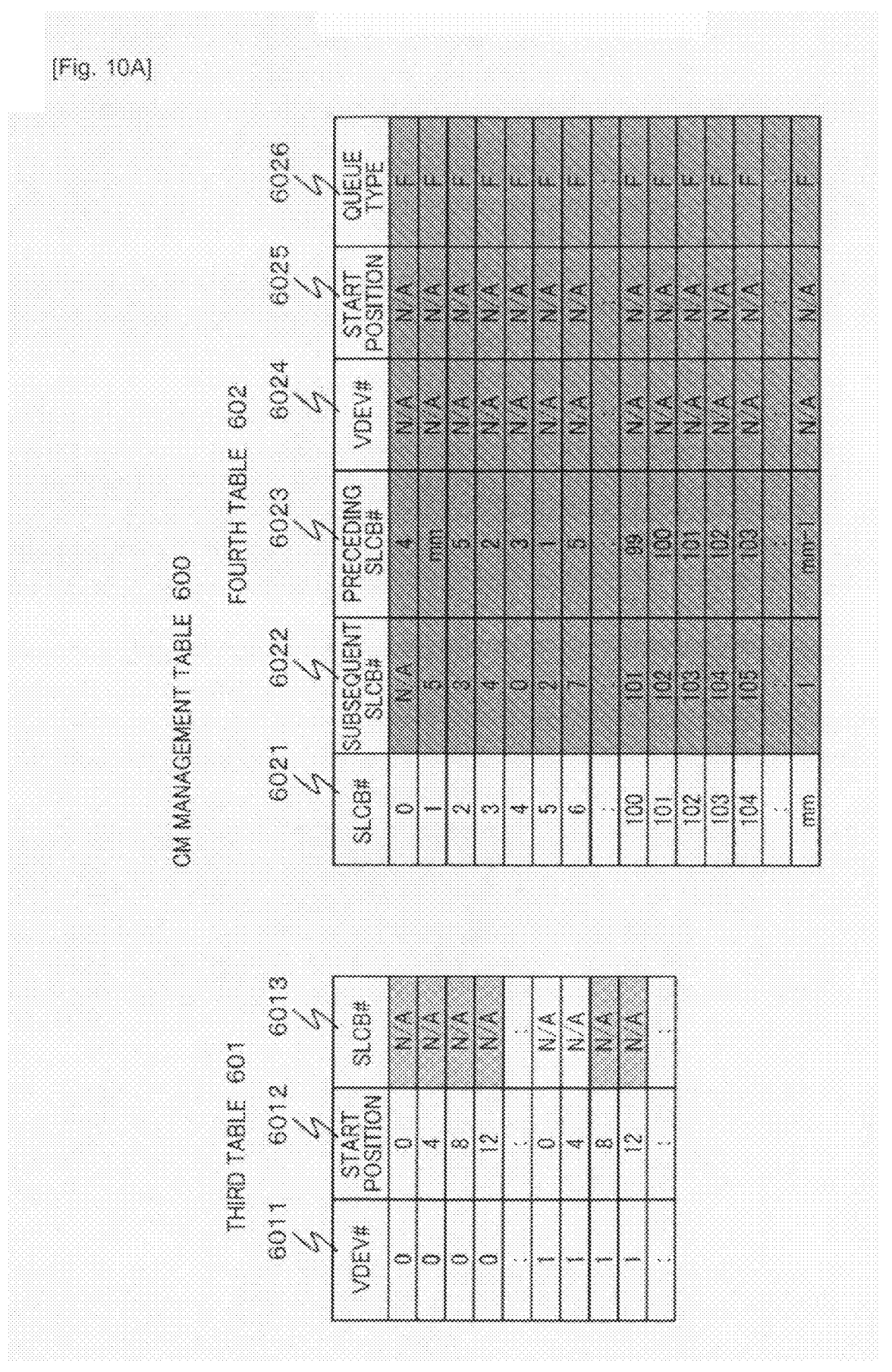

CM MANAGEMENT TABLE 600

THIRD TABLE 601

| VDEV# 6011 | START POSITION 6012 | SLOB# 6013 |
|---|---|---|
| 0 | 0 | N/A |
| 0 | 4 | N/A |
| 0 | 8 | N/A |
| 0 | 12 | N/A |
| ... | ... | ... |
| 1 | 0 | N/A |
| 1 | 4 | N/A |
| 1 | 8 | N/A |
| 1 | 12 | N/A |
| ... | ... | ... |

FOURTH TABLE 602

| SLOB# 6021 | SUBSEQUENT SLCB# 6022 | PRECEDING SLCB# 6023 | VDEV# 6024 | START POSITION 6025 | QUEUE TYPE 6026 |
|---|---|---|---|---|---|
| 0 | N/A | 4 | N/A | N/A | F |
| 1 | 3 | mm | N/A | N/A | F |
| 2 | 3 | 5 | N/A | N/A | F |
| 3 | 4 | 2 | N/A | N/A | F |
| 4 | 0 | 3 | N/A | N/A | F |
| 5 | 2 | 6 | N/A | N/A | F |
| 6 | 7 | 5 | N/A | N/A | F |
| ... | ... | ... | ... | ... | ... |
| 100 | 101 | 99 | N/A | N/A | F |
| 101 | 102 | 100 | N/A | N/A | F |
| 102 | 103 | 101 | N/A | N/A | F |
| 103 | 104 | 102 | N/A | N/A | F |
| 104 | 105 | 103 | N/A | N/A | F |
| ... | ... | ... | ... | ... | ... |
| mm | 1 | mm-1 | N/A | N/A | F |

[Fig. 10B]

CLEAN QUEUE MANAGEMENT TABLE 610

| HEAD SLCB# | END SLCB# |
|---|---|
| N/A | N/A |

DIRTY QUEUE MANAGEMENT TABLE 620

| HEAD SLCB# | END SLCB# |
|---|---|
| N/A | N/A |

FREE QUEUE MANAGEMENT TABLE 630

| HEAD SLCB# | END SLCB# |
|---|---|
| 0 | mm |

DP-VOL MANAGEMENT TABLE 210

SECOND TABLE 212

| PSCB# | SUBSEQUENT PSCB# | PRECEDING PSCB# | POOL-LDEV# | START POSITION | NUMBER OF LINKS |
|---|---|---|---|---|---|
| 2121 | 2122 | 2123 | 2124 | 2125 | 2126 |
| 0 | 2 | N/A | 0 | 0 | 2 |
| 1 | 2 | 0 | 0 | 4 | 1 |
| 2 | 4 | 1 | 0 | 8 | 0 |
| 3 | N/A | mm | 0 | 12 | 0 |
| 4 | 5 | 2 | 0 | 16 | 1 |
| 5 | N/A | 4 | 0 | 20 | 0 |
| 6 | 7 | N/A | 0 | 24 | 0 |
| ... | ... | ... | ... | ... | ... |
| 100 | 101 | 99 | 1 | 0 | 0 |
| 101 | 102 | 100 | 1 | 4 | 0 |
| 102 | 103 | 101 | 1 | 8 | 0 |
| 103 | 104 | 102 | 1 | 12 | 0 |
| 104 | 105 | 103 | 1 | 16 | 0 |
| ... | ... | ... | ... | ... | ... |
| mm | 3 | mm-1 | pp | xxxxx | 0 |

FIRST TABLE 211

| DP-LDEV# | START POSITION | PSCB# |
|---|---|---|
| 2111 | 2112 | 2113 |
| 0 | 0 | 0 |
| 0 | 4 | 1 |
| 0 | 8 | 2 |
| 0 | 12 | 3 |
| ... | ... | N/A |
| 1 | 0 | N/A |
| 1 | 4 | 4 |
| 1 | 8 | 5 |
| 1 | 12 | ... |

[Fig. 11B]

USE QUEUE MANAGEMENT TABLE 410

| HEAD PSCB# | END PSCB# |
|---|---|
| 0 | 5 |

FREE QUEUE MANAGEMENT TABLE 420

| HEAD PSCB# | END PSCB# |
|---|---|
| 6 | |

4201　　4202

[Fig. 12A]
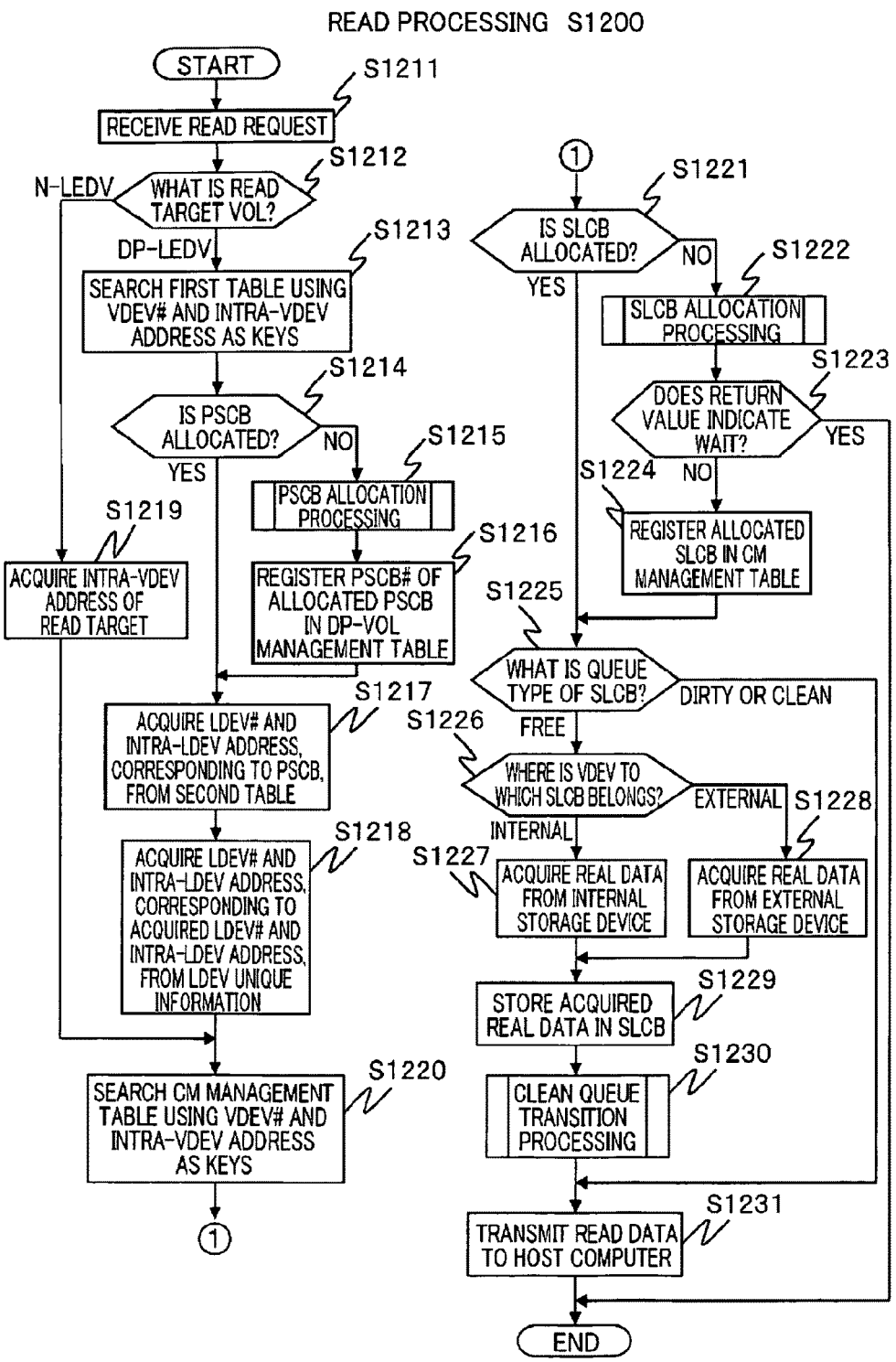

[Fig. 12B]
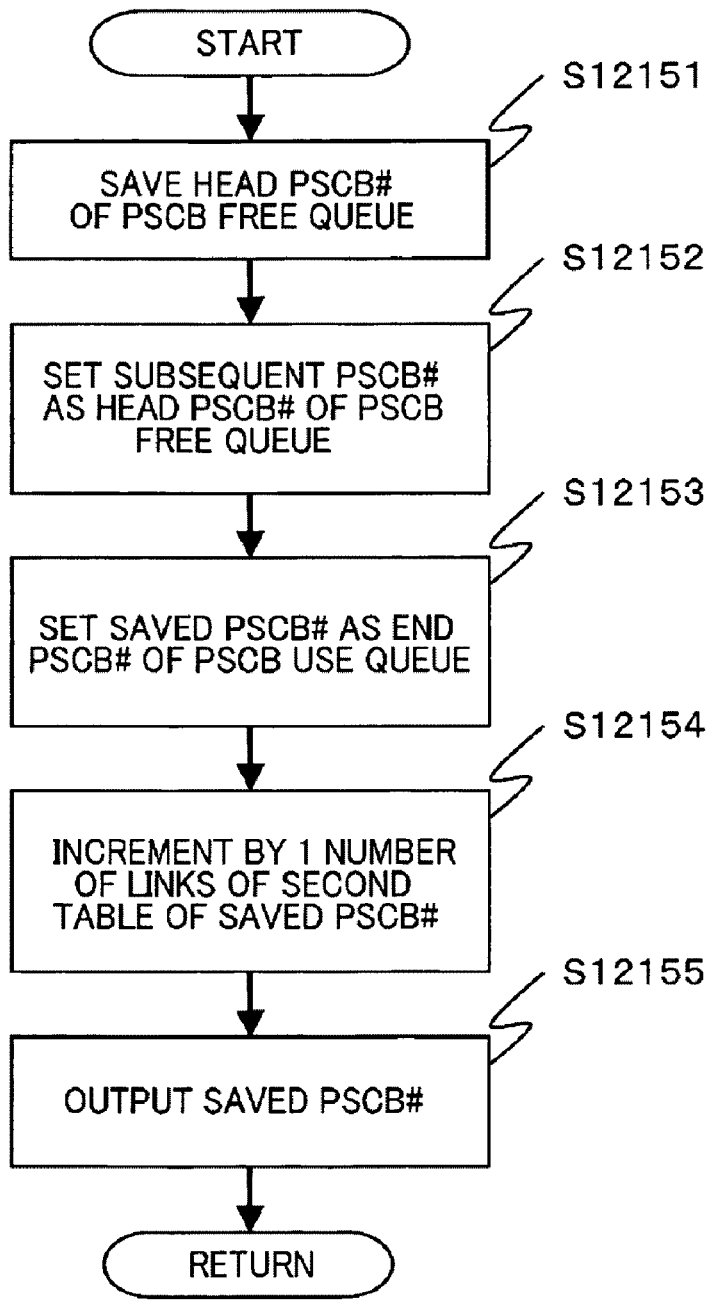

[Fig. 12C]
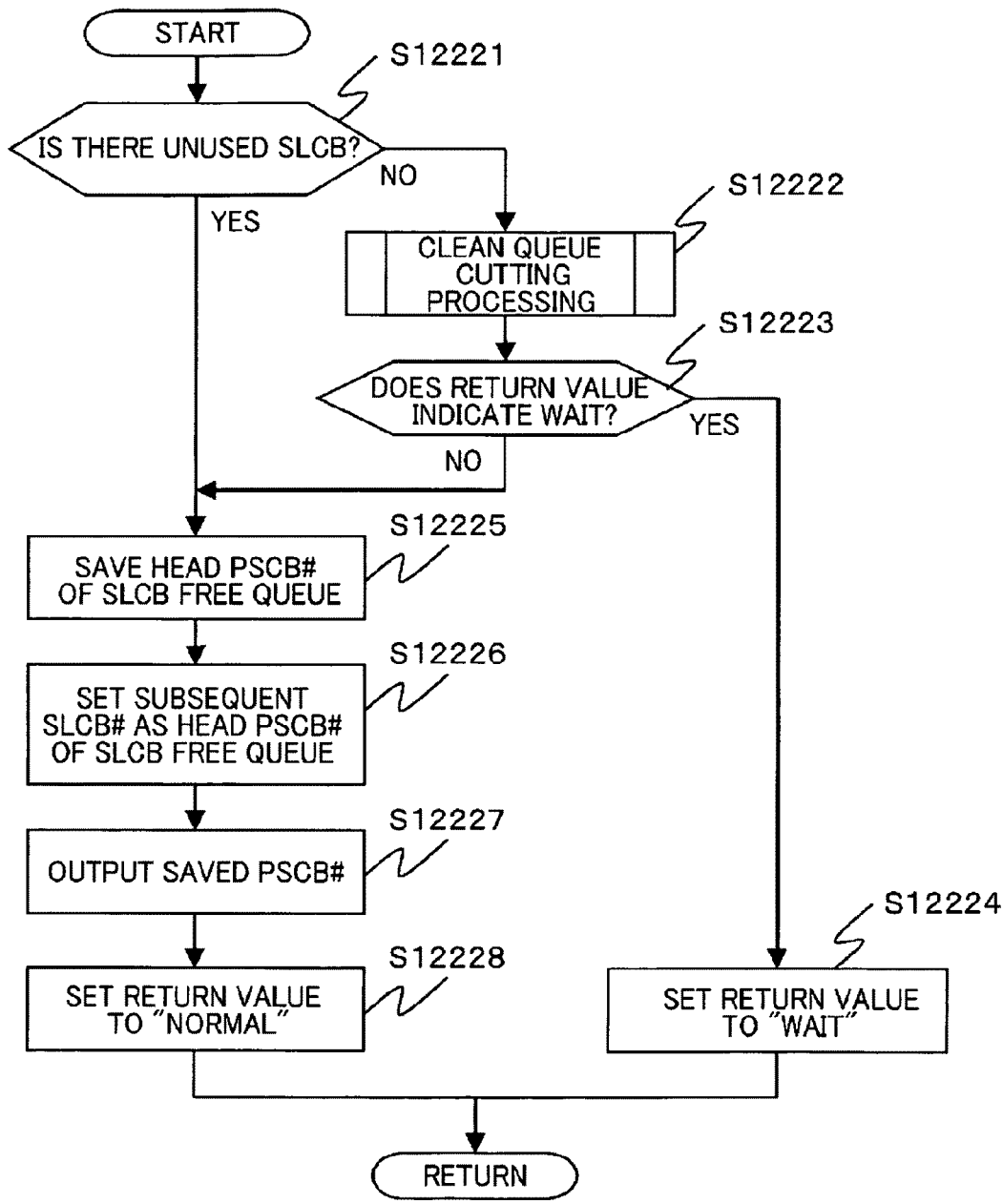

[Fig. 12D]
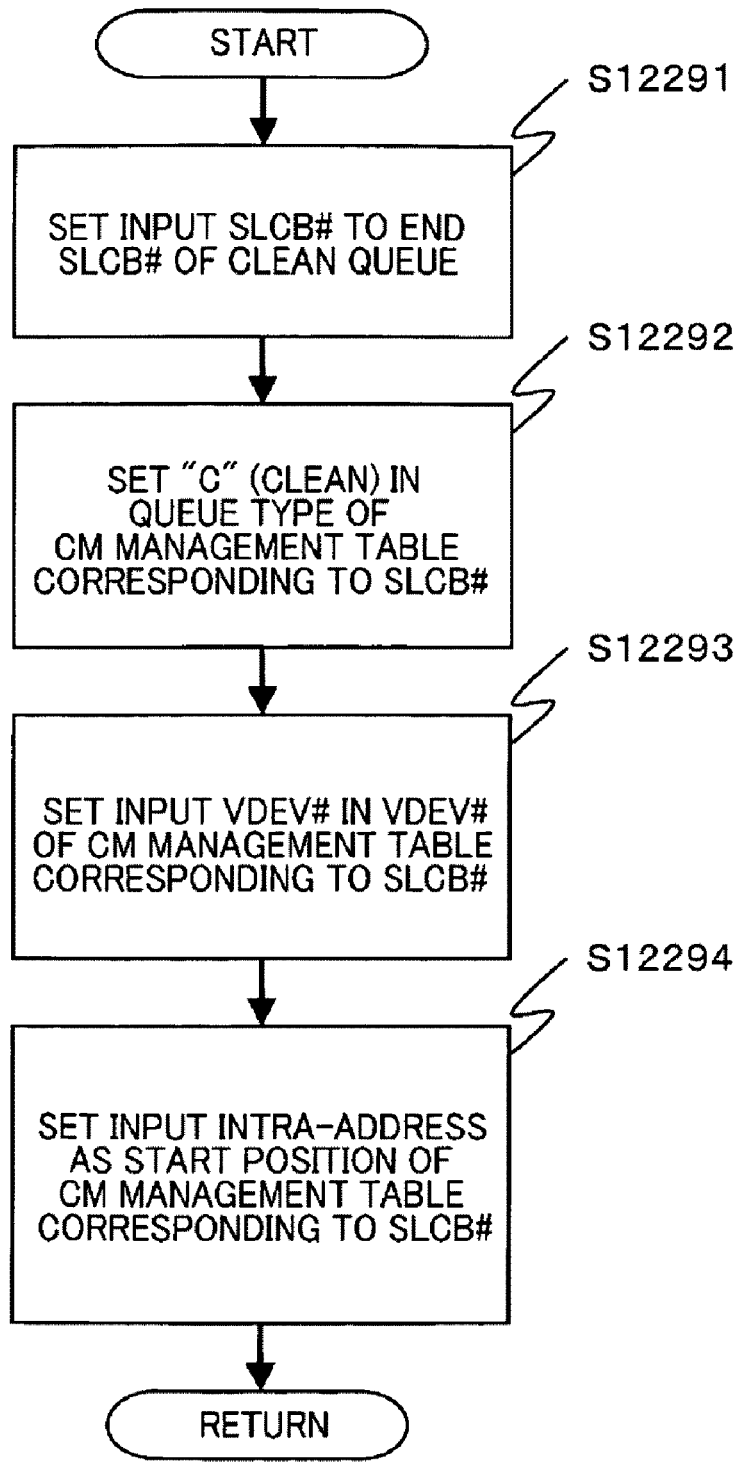

[Fig. 12E]
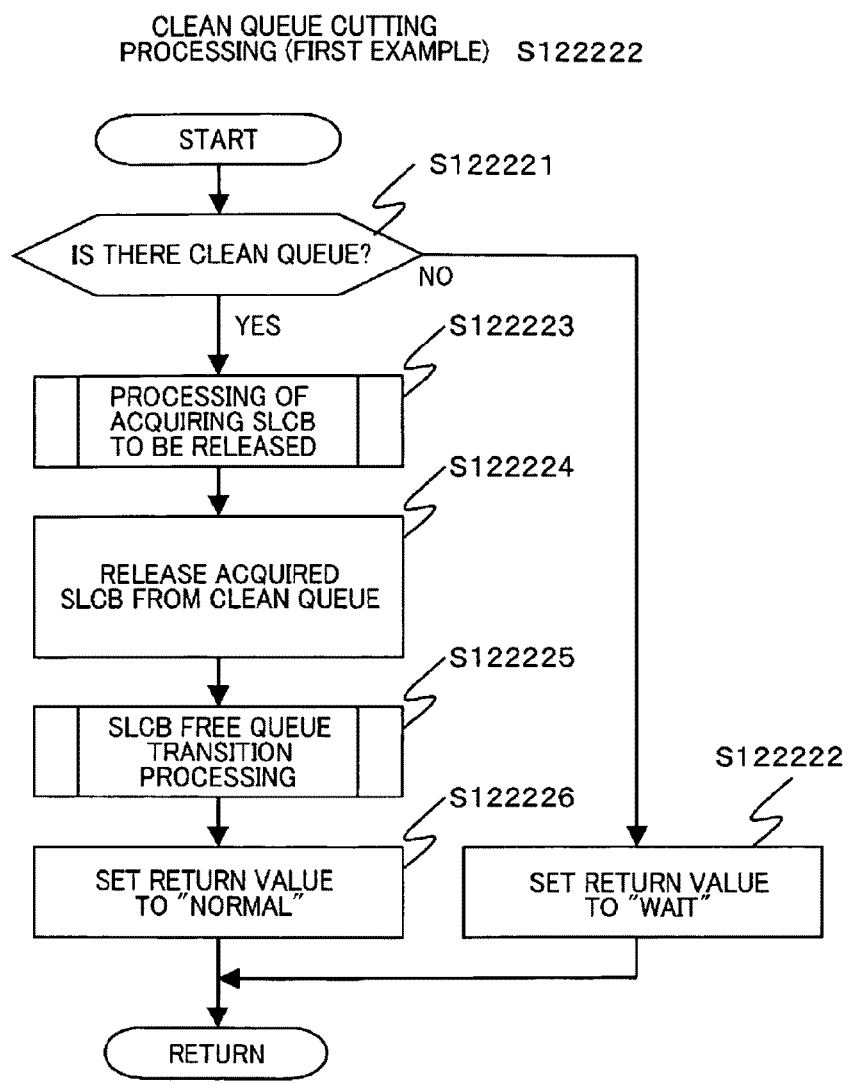

[Fig. 12F]
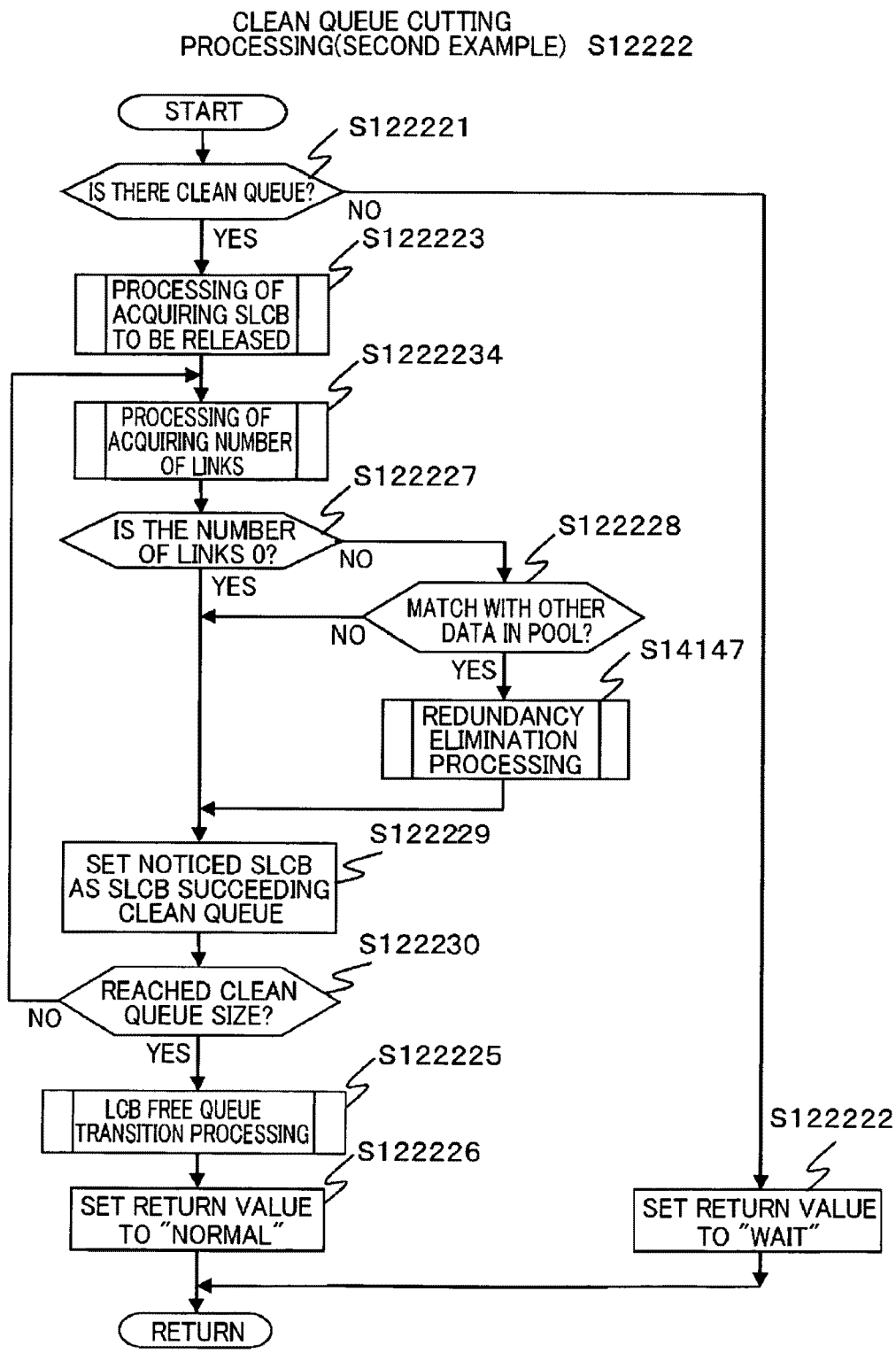

[Fig. 12G]
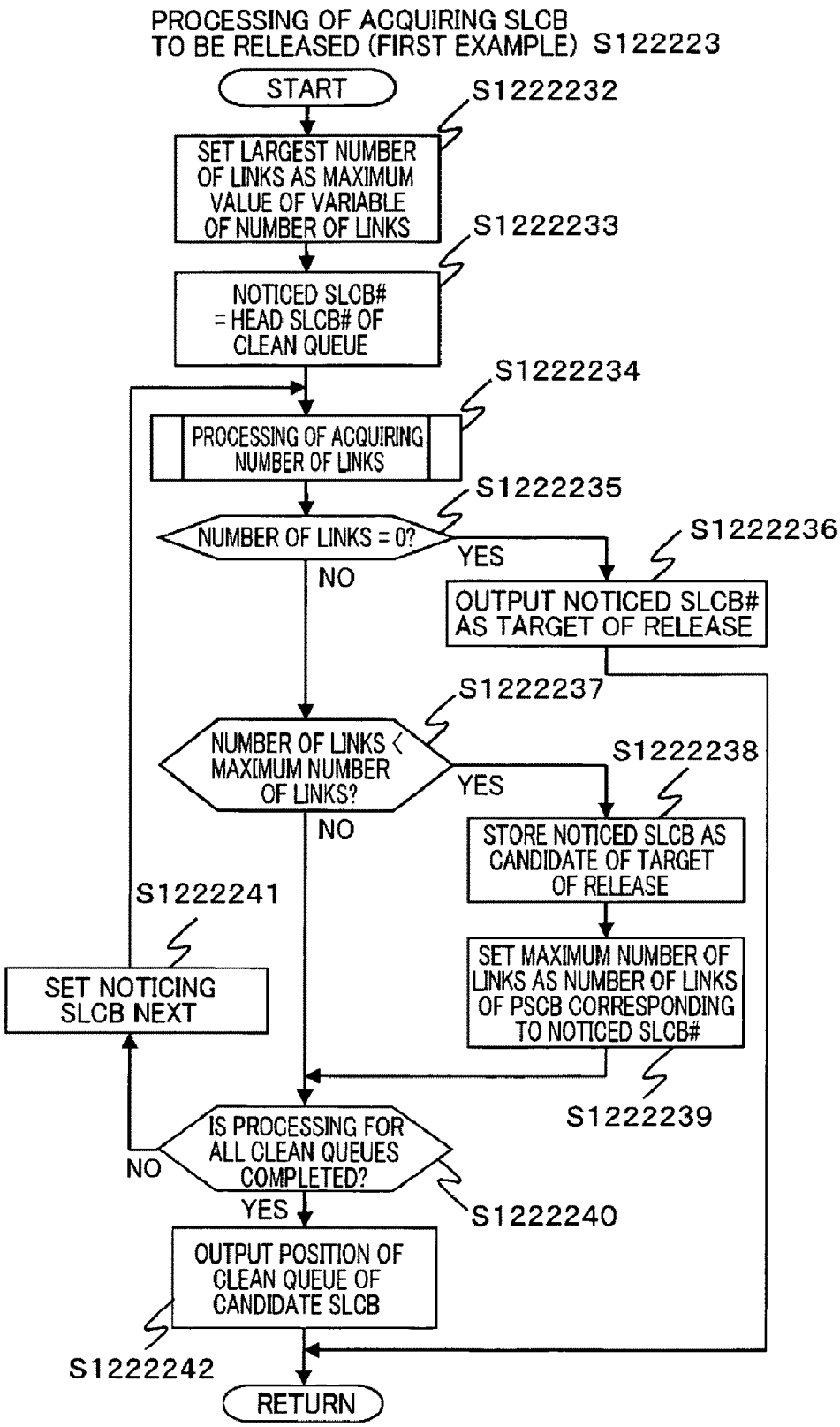

[Fig. 12H]
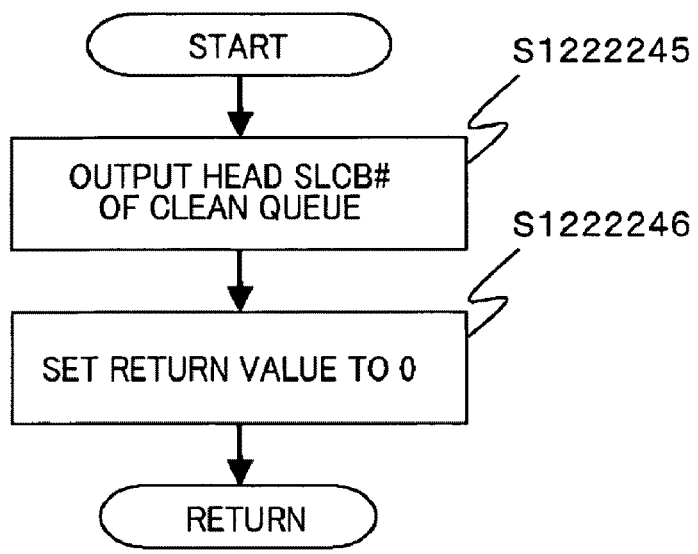

[Fig. 12I]
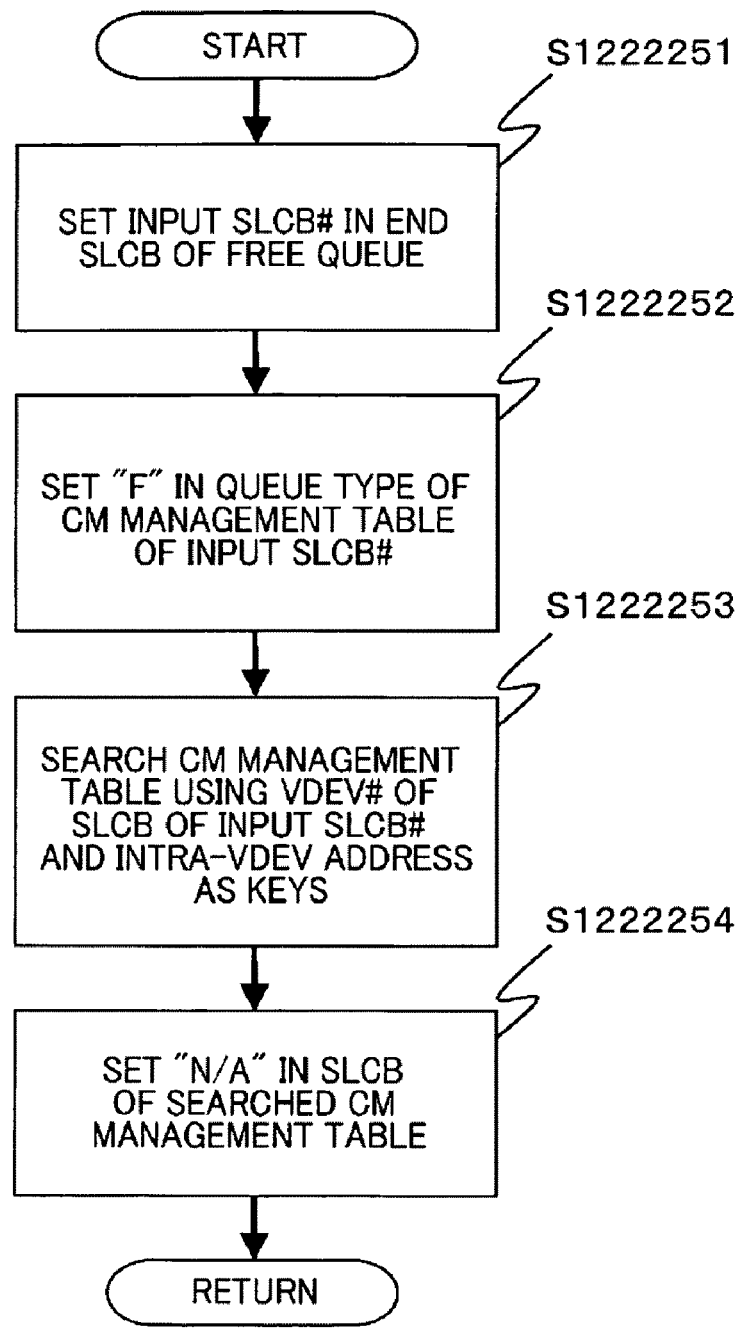

[Fig. 12J]
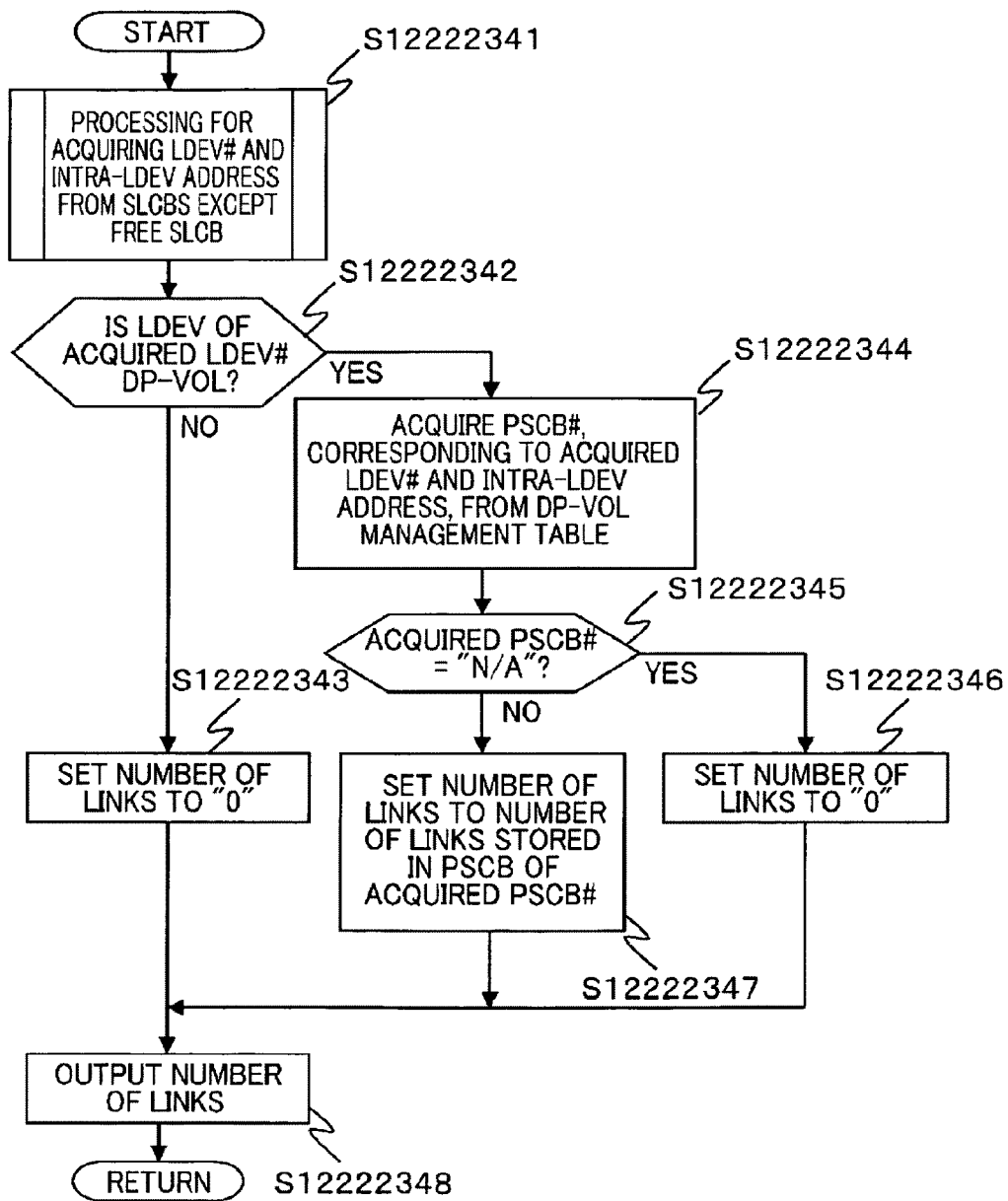

[Fig. 12K]
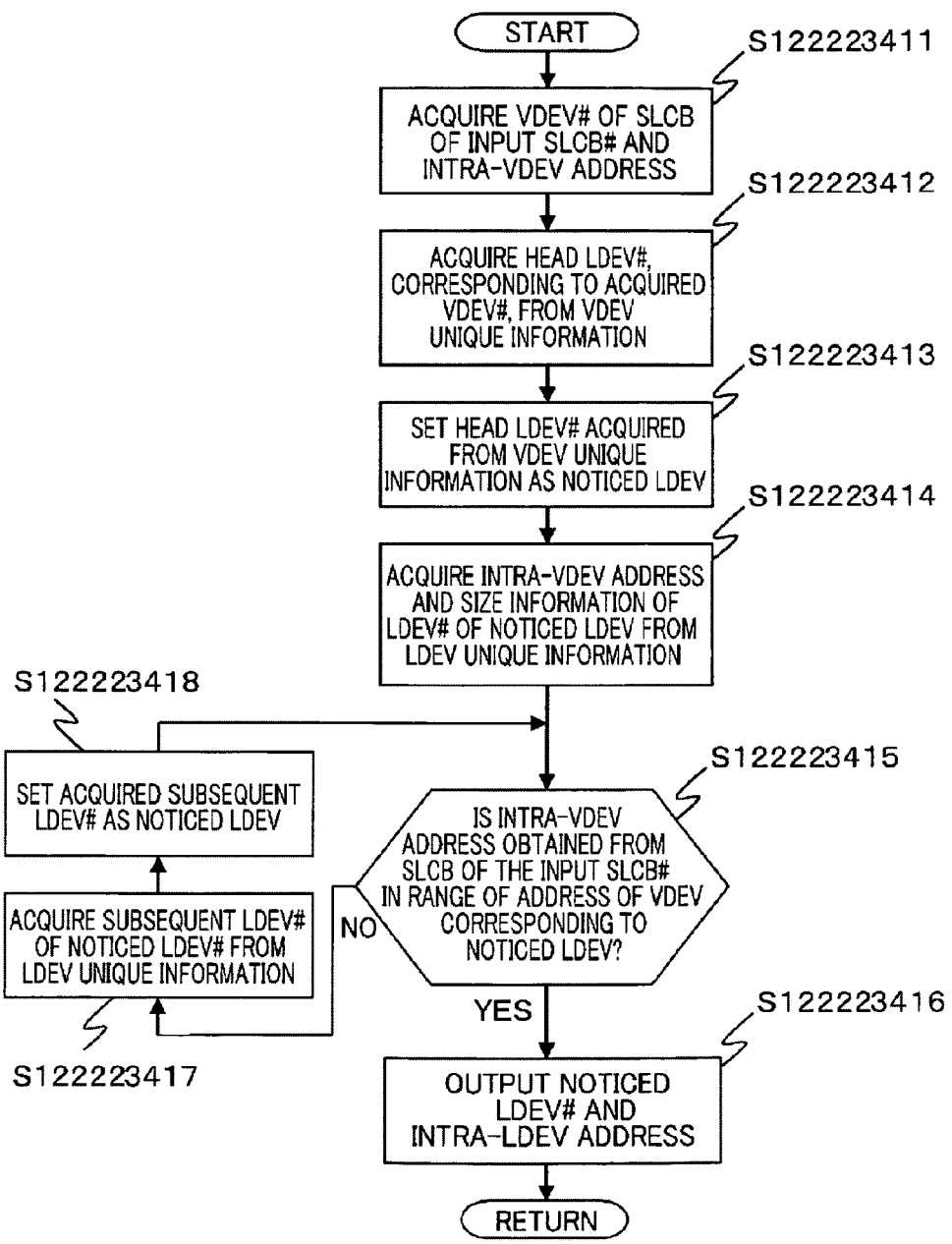

[Fig. 13A]
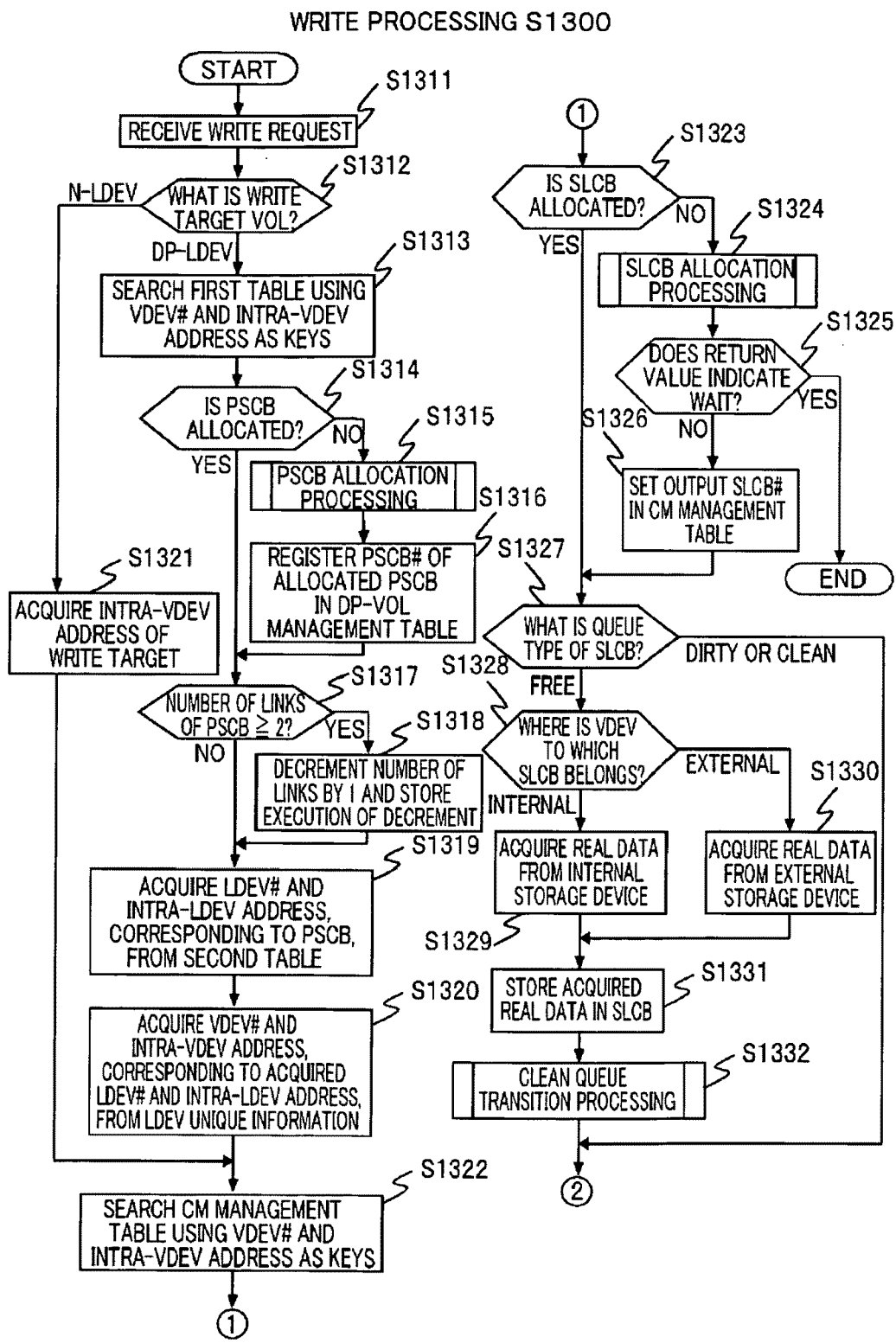

[Fig. 13B]
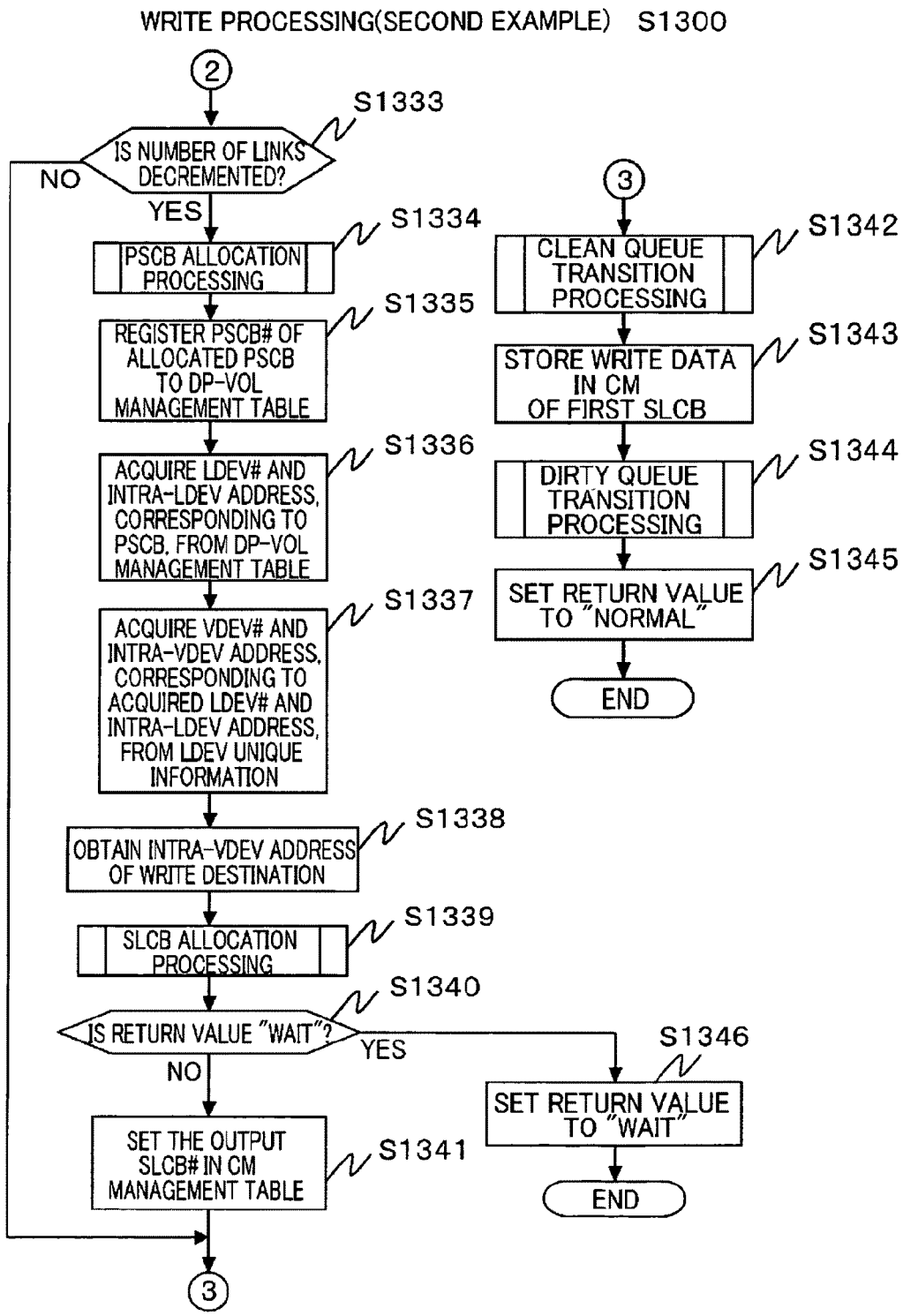

[Fig. 13C]
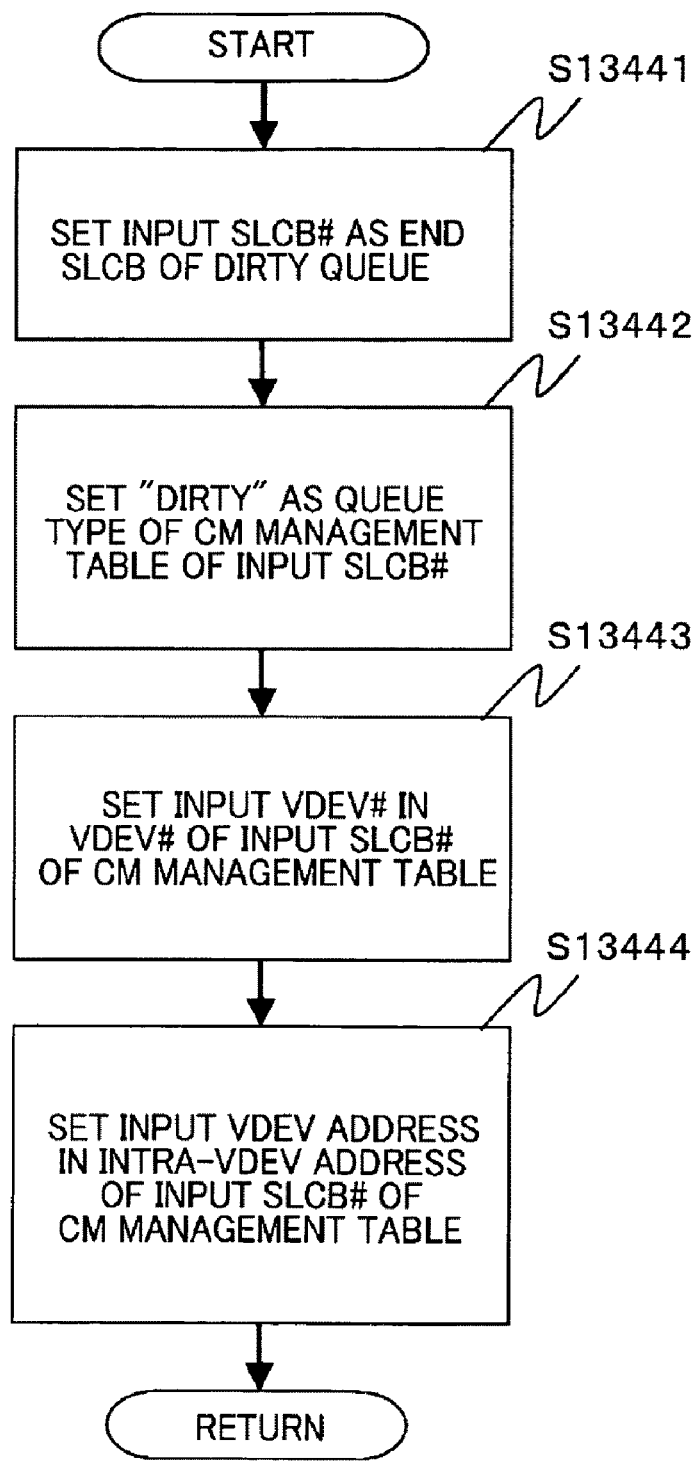

[Fig. 14A]
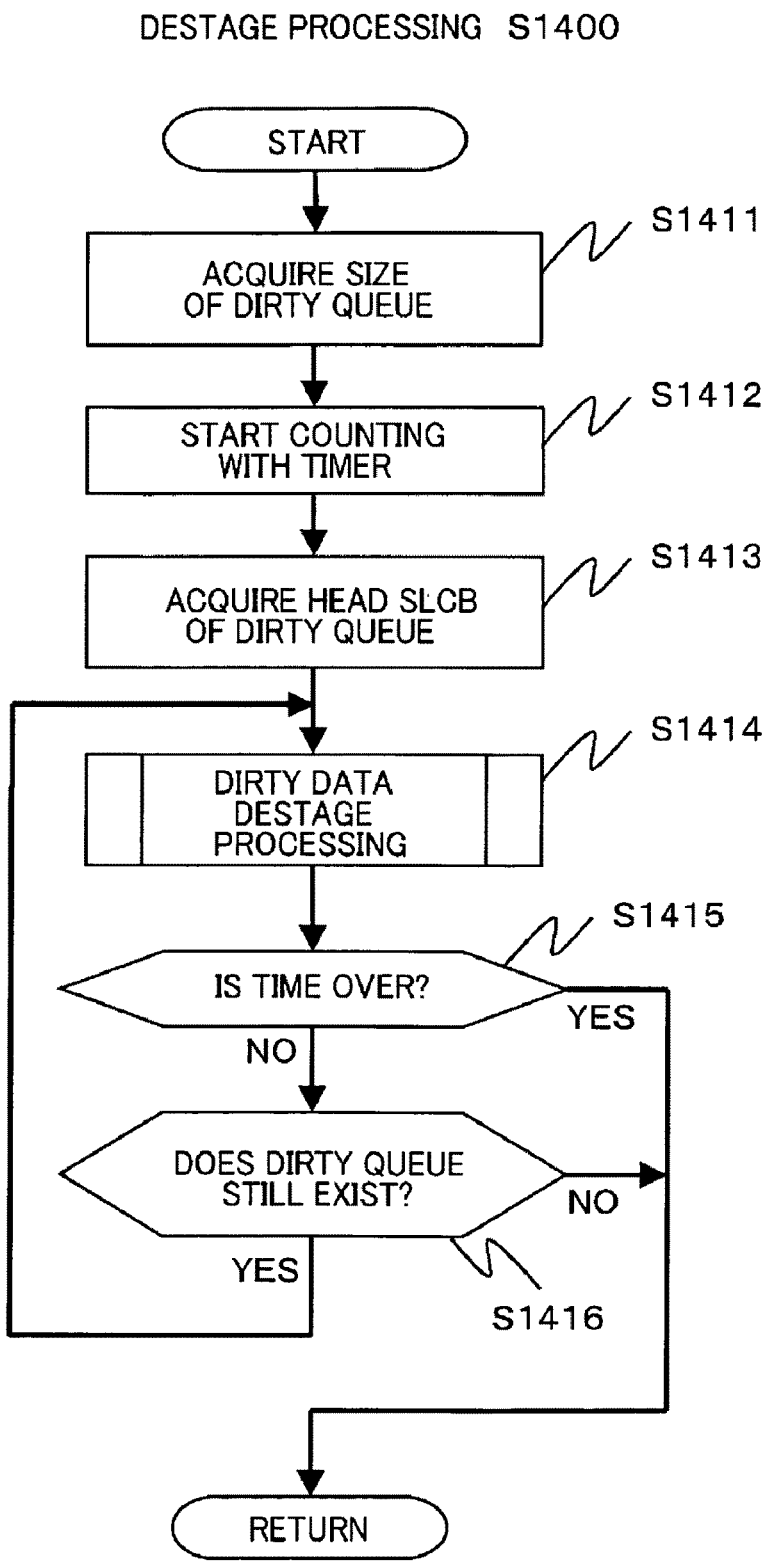

[Fig. 14B]
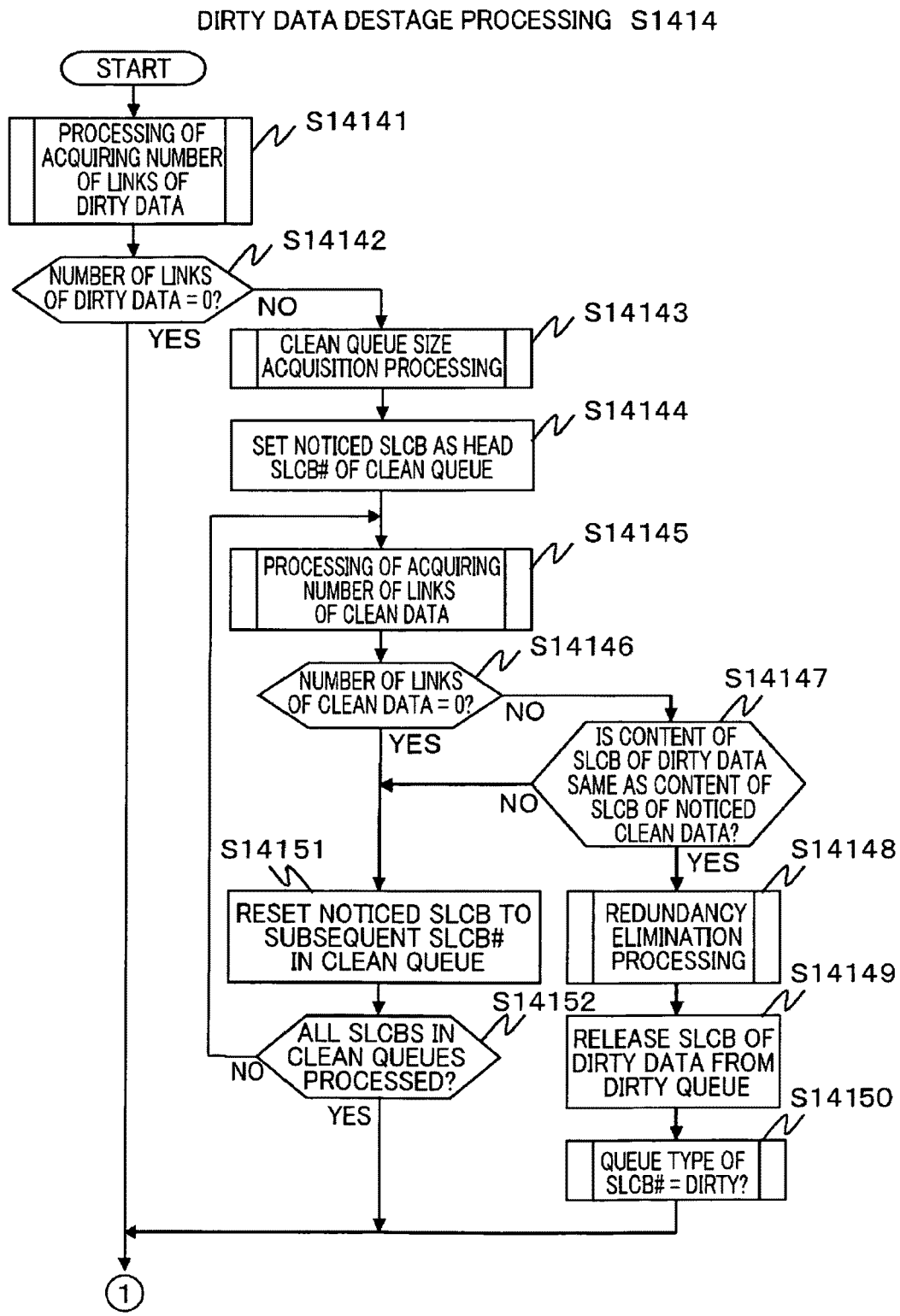

[Fig. 14C]
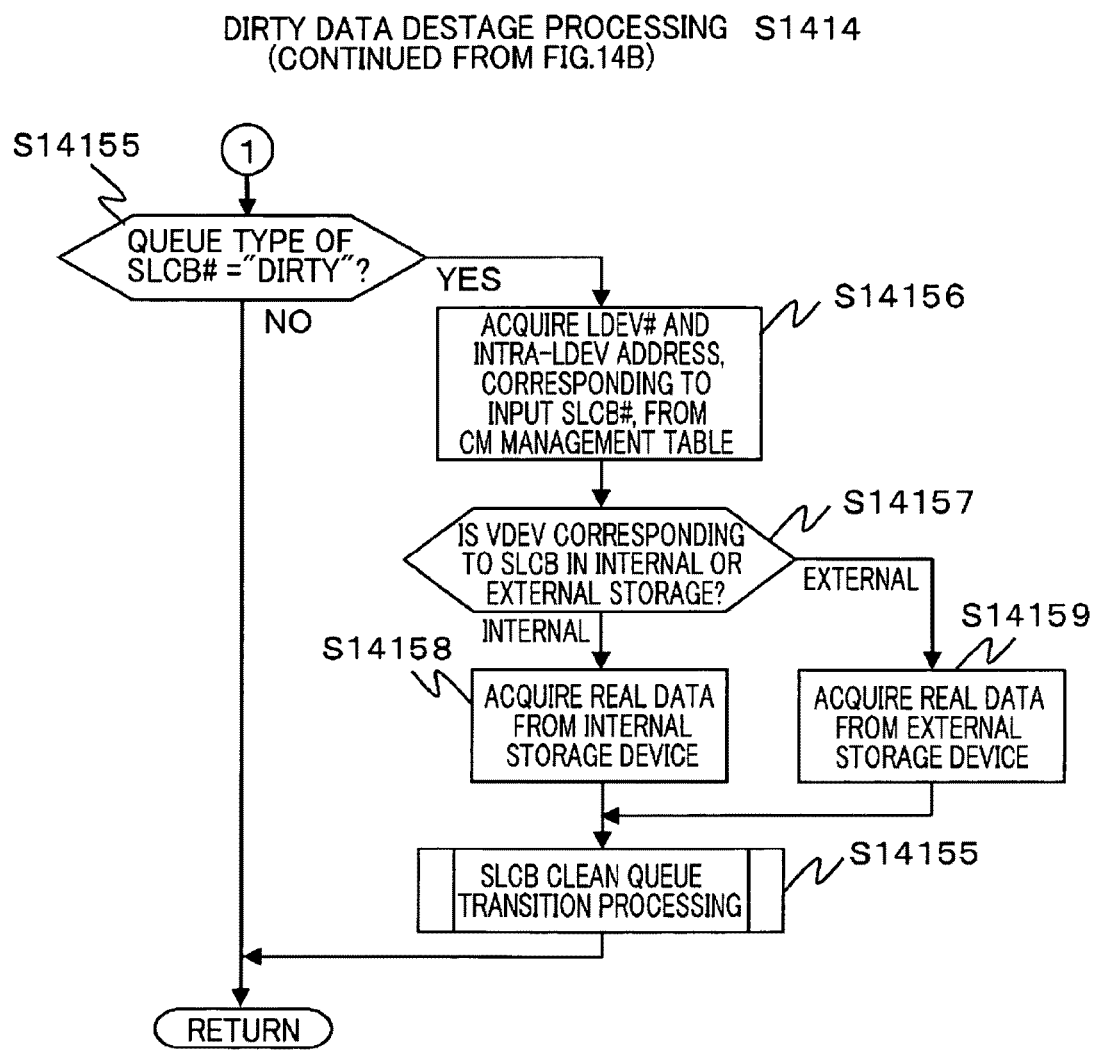

[Fig. 14D]
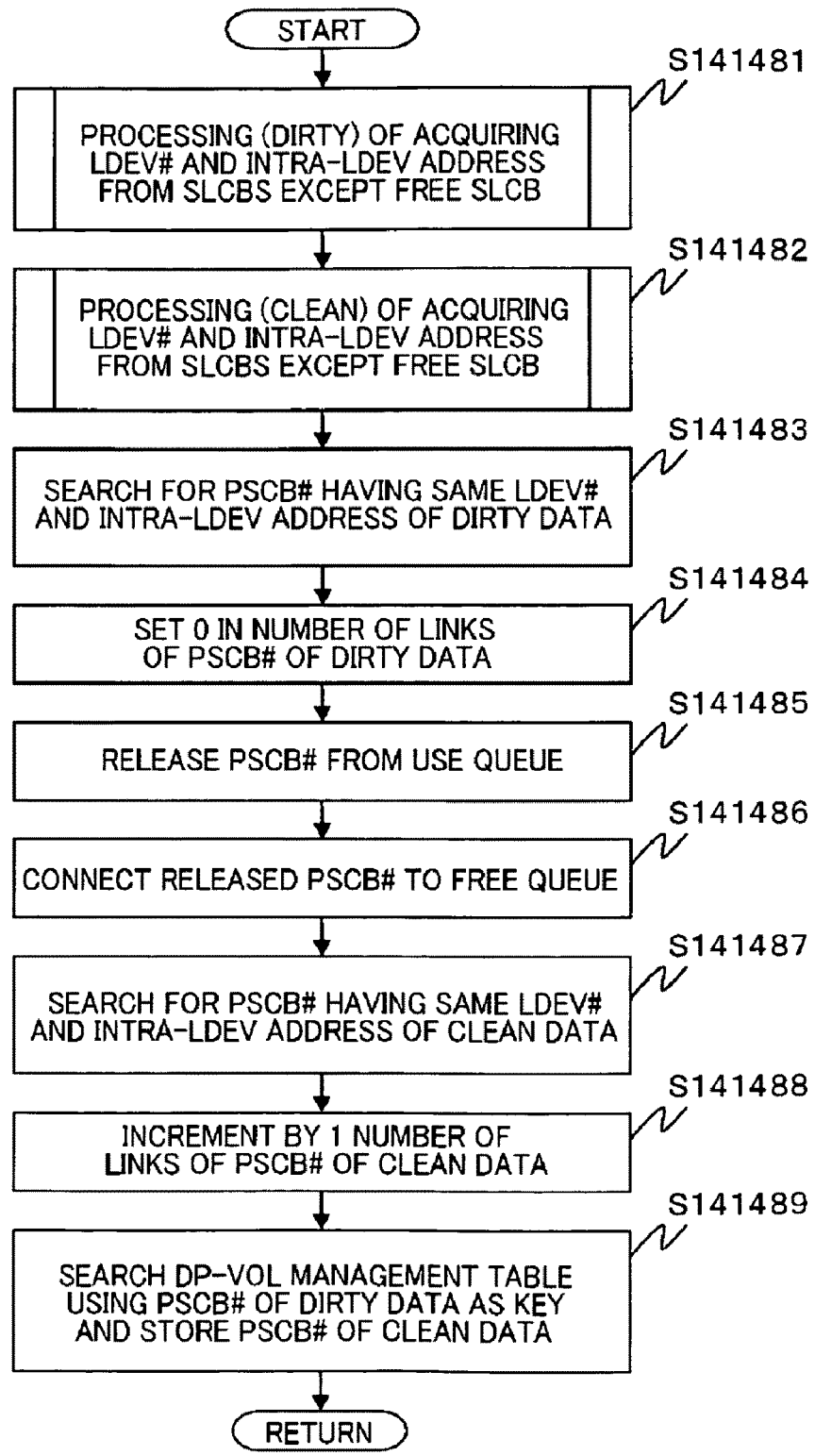

STORAGE APPARATUS AND METHOD FOR ELIMINATING REDUNDANT DATA STORAGE USING STORAGE APPARATUS

CROSS-REFERENCE TO RELATED APPLICATIONS

This application is a National Stage Entry application under 35 U.S.C. §371 of PCT/JP2009/000429, filed on Feb. 4, 2009. The content of the specification is incorporated herein by reference.

TECHNICAL FIELD

The present invention relates to a storage apparatus and a method for eliminating redundant data storage using a storage apparatus, and particularly relates to a technique for eliminating redundant data stored in a storage resource of a storage system using dynamic provisioning to provide efficient use of the storage resource.

BACKGROUND ART

With progress of the computerized society, the amount of data handled for information processing has been increased in an organization such as a company and the like. Accordingly, the storage system has been increased in size and complexity. For this reason, in an organization such as a company or the like, demand has been growing more than ever before for suppression of management cost and operation cost of the storage system to reduce TCO (Total Cost of Ownership) and improve the effect of an investment in the storage system.

As a technique of reducing TCO, so-called dynamic provisioning (volume capacity virtualization function) is known. In the dynamic provisioning, storage resources supplied by multiple disk drives are pooled and managed, and a virtual logical volume, which is configured using pooled real storage resources, is provided to a host computer, unlike the conventional method in which real storage resources are introduced in advance depending on a capacity to be used in the future. Then, when the capacity of the real storage resources becomes actually insufficient, the real storage resources are replenished as required. According to the dynamic provisioning, it is possible to facilitate capacity design of the storage system, to reduce initial introduction cost as well as operational costs such as power/air-conditioning costs, and to produces other advantageous effects.

Regarding the technique using the dynamic provisioning, Japanese Patent Application Laid-open Publication No. 2007-265270, for example, describes a storage system for improving operation efficiency of a storage area. This storage system includes: a pool area generation unit that generates multiple pool areas each configured of a storage area; a setting unit that sets an allocation size of the storage area for each of the multiple pool areas generated by the pool area generation unit, the allocation size being used to allocate the storage area of the pool area to a virtual logical volume; a selection unit that, when data to be stored in the storage area is transmitted from a host computer, selects one of the pool areas set by the setting unit according to the size of the data; and an allocation unit that allocates the storage area of the pool area selected by the selection unit to the virtual logical volume.

Further, in Japanese Patent Application Laid-open Publication No. 2006-350418, there is described that: in order to facilitate extension of storage capacity while suppressing investment related to storage capacity, a system configuration information is stored which includes content of a definition, set externally, of a virtual volume with storage capacity that is larger than a real storage capacity composed of the storage capacity of a storage device unit, and content of a definition, set externally, of at least one of a real volume formed as a result of dividing the real storage capacity, and a pool area; the storage capacity of the virtual volume based on the stored system configuration information is communicated in response to a storage capacity confirmation request from the host system; based on the system configuration information, a relevant data is written or read to or from a relevant address position in the storage device unit in response to a data input/output request from the host system designating an address in the real volume; and the relevant data is written or read to or from the pool area in response to a data input/output request from the host system designating an address in the virtual volume other than the real volume.

In connection with the effective use of the storage areas that the storage system possesses, various trials have been made to prevent redundant storage of data into the storage resource.

Japanese Patent Application Laid-open Publication No. 7-319897, for example, describes a method for detecting redundancy of information stored in a storage medium to improve efficiency of information management, in which: one of files stored in a secondary storage device is read from an information reading unit and the read file is stored in an information storing unit; another file is read from the information reading unit to perform comparison with the file stored in the information storing unit; an attribute comparison unit makes comparison in attributes (file name, file size, creation date, and update date) between both files; a content comparison unit makes matching of contents between both files; and a redundancy determination unit compares the degree of the match obtained as a result of the comparison, with a default value which is set in a specified value table in advance, to determine redundancy of both files.

Moreover, Japanese Patent Application Laid-open Publication No. 2003-308232 describes a data management device for automatically deleting unnecessary electronically stored data, that is, data already electronically stored, without imposing burdens on users. Specifically, the data management device determines whether or not to store in a storage device electronically stored data (file) which is generated and is electronically stored in the storage device every time document printing is performed, and then electronically stores only necessary electronically stored data. In addition, the data management device determines, on the basis of data for controlling the redundant storage, whether or not to delete electronically stored data whose generation time overlaps that of electronically stored data which is newly electronically stored. Then, the data management device deletes unnecessary electronically stored data with the overlapping generation time.

DISCLOSURE OF INVENTION

Technical Problem

From the viewpoint of TCO reduction, the system using the dynamic provisioning is effective to efficiently use storage areas of the real storage resources by eliminating redundant data storage. However, when the mechanism of eliminating redundant storage is to be introduced to the storage apparatus which adopts the dynamic provisioning, there is a need to consider an influence on the existing mechanism and performance of the dynamic provisioning that provides the virtual logical volume from the pool configured of the real storage resource.

Both Japanese Patent Application Laid-open Publication No. 7-319897 and Japanese Patent Application Laid-open Publication No. 2003-308232 describe the mechanism of eliminating redundancy of data in the unit of a file. In General, however, the storage apparatus handles data in the unit of a block, and therefore the mechanism handling data in the unit of a file cannot be directly applied to the storage apparatus. Moreover, in the mechanism in the unit of a file, the size of the storage area to be subjected to redundancy elimination depends on the file size. Therefore, the larger the file size, the lower the probability that the contents of multiple files compared will match to each other, and thus lesser effect of redundancy elimination can be expected.

Technical Solution

In view of the aforementioned circumstances, it is an object of the present invention to provide a storage apparatus and a method for eliminating redundant data storage using the storage apparatus, which are capable of eliminating redundant data stored by storage resources in a storage system using dynamic provisioning to provide efficient use of the storage resource.

In order to solve the above and other problems, a storage apparatus according to one aspect of the present invention includes:

a channel control unit that receives an I/O request to a storage device from an external device; a storage device control unit that writes or reads data to or from the storage device;

a cache memory accessible from the channel control unit and the storage device control unit;

an I/O processing unit that causes the storage device control unit to write or read data in response to the I/O request received by the channel control unit;

a real logical device management unit that provides a real logical device which is a logical device configured of a storage area of the storage device; and a virtual logical device management unit that provides a virtual logical device which is a virtual logical device configured of a storage area of the real logical device, in a dynamic provisioning system, in which the real logical device management unit manages the storage area of the real logical device by dividing the storage area into unit cache areas, which are predetermined management units of storage area of the cache memory, the virtual logical device management unit manages the storage area of the virtual logical device by dividing the storage area into virtual unit areas, which are predetermined management units, and the I/O processing unit manages data stored in the storage device by establishing correspondence between one of the unit cache areas and a plurality of the virtual unit areas having the same data stored therein.

According to the present invention, in a storage system using dynamic provisioning, it is possible to eliminate redundant storage of data to make efficient use of the storage area of the storage resources. Moreover, it is possible to eliminate redundant storage of data in a management unit (in the unit of a block or the like) of data on the storage apparatus side, and therefore sufficient effect of the elimination can be expected as compared with a case in which elimination is performed in the unit of a file.

In the storage apparatus according to one aspect of the present invention, if data of one of the unit cache areas with destage uncompleted in the cache memory is the same as data of a unit cache area with destage completed in the cache memory, the I/O processing unit establishes the correspondence by causing only the data of the unit cache area with destage completed to remain in the cache memory and then making the unit cache area of the remained data correspond to the plurality of virtual unit areas.

Thus, it is possible to establish the correspondence with at the timing of, for example, destaging data from the cache memory. Further, destaging is carried out independently of a processing that is performed in response to the I/O request from the host computer or the like. Therefore, a processing for establishing the correspondence is executed at the timing of destaging as in the present invention, thereby making it possible to suppress an influence on an external apparatus which makes use of the storage device.

In the storage apparatus according to one aspect of the present invention, the I/O processing unit manages the number of the virtual unit areas which are made to correspond to the unit cache area as the number of links, and, if no unused storage area exists in the cache memory but a plurality of storage areas with destage completed exist in the cache memory at the time of storing data in the cache memory, reserves a storage area in the cache memory for storing the data by releasing the storage area corresponding to the unit cache area having the least number of links.

Thus, the unit cache area having the least number of links, namely, the storage area made to correspond to (being linked with) the smallest number of virtual unit areas is selected and released so as to reserve a storage area for storing data in the cache memory. This makes it possible to minimize a reduction in a hit rate of the cache memory in the general I/O processing.

In the storage apparatus according to another aspect of the present invention, when receiving the I/O request, the I/O processing unit allocates the virtual unit area and the unit cache area for a processing in response to the I/O request, and stores data transmitted and received between the channel control unit and the storage device control unit in response to the I/O request, in the storage area of the cache memory corresponding to the allocated unit cache area.

Thus, when receiving the I/O request from the external apparatus, the storage apparatus executes I/O for the storage device by allocating the virtual unit area and the unit cache area for a processing in response to the I/O request, and storing data transmitted and received between the channel control unit and the storage device control unit in response to the I/O request, in the storage area of the cache memory corresponding to the allocated unit cache area.

In the storage apparatus according to one aspect of the present invention, the I/O processing unit manages the number of virtual unit areas which is made to correspond to the unit cache area as a number of links, when the I/O request is a data write request to the storage device, reads data stored in an area of a write destination of the write request from the storage device, and stores the read data in the storage area of the cache memory corresponding to the allocated real unit area, stores write data of the write request in the storage area of the cache memory corresponding to the allocated real unit area if the number of links is 0, and allocates a new virtual unit area and a new unit cache area, and stores the write data of the write request in the storage area of the cache memory corresponding to the newly allocated unit cache area if the number of links is not 0.

Thus, upon reception of the data write request from the external apparatus, the I/O processing unit stores write data of the write request in the storage area of the cache memory corresponding to the allocated real unit area if the number of links is 0, whereas it allocates a new virtual unit area and a new unit cache area and stores write data of the write request in the storage area of the cache memory corresponding to the newly allocated unit cache area if the number of links is not 0. By this means, even when redundancy elimination is managed, that is, even when the multiple virtual unit areas having the same data stored are made to correspond to the same unit cache area, it is possible to write data of the virtual unit area as a writing target without fail.

In the storage apparatus according to one aspect of the present invention, when the I/O request is a data read request to the storage device, the I/O processing unit reads data stored in an area of a read destination of the read request from the storage device and stores the read data in the storage area of the cache memory corresponding to the allocated real unit area.

Thus, when receiving the data read request from the external apparatus, the I/O processing unit stores the read data in the storage area of the cache memory corresponding to the allocated real unit area, thereby executing the I/O for the storage device in response to the read request.

In addition, the problem disclosed in this application and the method for solving the problem will become clear from the embodiment of the invention and the drawings.

Advantageous Effects

According to the present invention, it is possible to eliminate redundant storage of data of a storage resource in a storage system using dynamic provisioning to make efficient use of the storage resource.

BRIEF DESCRIPTION OF DRAWINGS

FIG. 1A is a view illustrating a schematic configuration of a storage system 1.

FIG. 1B is a view illustrating an example of a computer (information apparatus) usable as a host apparatus 2.

FIG. 1C is a view illustrating a hardware configuration of a CHA 11.

FIG. 1D is a view illustrating a hardware configuration of a DKA 12.

FIG. 2 illustrates a method for providing a storage area from a first storage apparatus 10-1 to a host computer 2.

FIG. 3A is a view explaining a method for managing a VDEV 205, a N-LDEV 201 and a POOL-LDEV 207 based on storage devices 15 (#0 to #3) of the first storage apparatus 10-1.

FIG. 3B is a view explaining a method for managing the VDEV 205 and the POOL-LDEV 207 based on storage devices 15 (#E0 and #E1) of a second storage apparatus 10-2.

FIG. 3C collectively illustrates major functions of a storage apparatus 10 and major tables managed by the storage apparatus 10.

FIG. 4A is a view illustrating one example of a DP-VOL management table 210.

FIG. 4B is a view illustrating one example of a used queue management table 410.

FIG. 4C is a view illustrating one example of a free queue management table 420.

FIG. 5A is a view illustrating one example of the DP-VOL management table 210.

FIG. 5B is a view illustrating one example of the used queue management table 410.

FIG. 5C is a view illustrating one example of the free queue management table 420.

FIG. 6A is a view illustrating one example of a CM management table 600;

FIG. 6B is a view illustrating one example of a clean queue management table 610.

FIG. 6C is a view illustrating one example of a dirty queue management table 620.

FIG. 6D is a view illustrating one example of a free queue management table 630.

FIG. 7A is a view illustrating one example of the CM management table 600.

FIG. 7B is a view illustrating one example of the clean queue management table 610.

FIG. 7C is a view illustrating one example of the dirty queue management table 620.

FIG. 7D is a view illustrating one example of the free queue management table 630.

FIG. 8A is a view illustrating one example of the CM management table 600.

FIG. 8B is a view illustrating one example of the clean queue management table 610.

FIG. 8C is a view illustrating one example of the dirty queue management table 620.

FIG. 8D is a view illustrating one example of the free queue management table 630.

FIG. 9A is a view illustrating one example of the CM management table 600.

FIG. 9B is a view illustrating one example of the clean queue management table 610.

FIG. 9C is a view illustrating one example of the dirty queue management table 620.

FIG. 9D is a view illustrating one example of the free queue management table 630.

FIG. 10A is a view illustrating one example of the CM management table 600.

FIG. 10B is a view illustrating one example of the clean queue management table 610.

FIG. 10C is a view illustrating one example of the dirty queue management table 620.

FIG. 10D is a view illustrating one example of the free queue management table 630.

FIG. 11A is a view illustrating one example of the DP-VOL management table 210.

FIG. 11B is a view illustrating one example of the used queue management table 410.

FIG. 11C is a view illustrating one example of the free queue management table 420.

FIG. 12A is a flowchart explaining a Read processing S1200.

FIG. 12B is a flowchart explaining a PSCB allocation processing S1215.

FIG. 12C is a flowchart explaining a SLCB allocation processing S1222.

FIG. 12D is a flowchart explaining a clean queue transition processing S1229.

FIG. 12E is a flowchart explaining a clean queue cutting processing S12222.

FIG. 12F is a flowchart explaining a clean queue cutting processing S12222.

FIG. 12G is a flowchart explaining a processing S122223 of acquiring a SLCB to be released.

FIG. 12H is a flowchart explaining a processing S122223 of acquiring a SLCB to be released.

FIG. 12I is a flowchart explaining a SLCB free queue transition processing S122225.

FIG. 12J is a flowchart explaining a processing S1222234 of acquiring the number of links.

FIG. 12K is a flowchart explaining a processing S12222341 of acquiring a LDEV# and intra-LDEV address from SLCBs except a free SLCB.

FIG. 13A is a flowchart explaining a Write processing S1300.

FIG. 13B is a flowchart explaining a Write processing S1300.

FIG. 13C is a flowchart explaining a dirty queue transition processing S1344.

FIG. 14A is a flowchart explaining a destage processing S1400.

FIG. 14B is a flowchart explaining a dirty data destage processing S1414.

FIG. 14C is a flowchart explaining a dirty data destage processing S1414.

FIG. 14D is a flowchart explaining a redundancy elimination processing S14148.

MODE FOR CARRYING OUT THE INVENTION

The following will describe embodiments of the present invention. FIG. 1 illustrates a schematic configuration of a storage system 1. The storage system 1 includes one or more host computers 2 (external apparatuses), multiple storage apparatus 10 (a first storage apparatus 10-1 and a second storage apparatus 10-2 in the present embodiment). The host computer 2 and the first storage apparatus 10-1 are communicably coupled to each other. The first storage apparatus 10-1 and the second storage apparatus 10-2 are also communicably coupled to each other.

In FIG. 1A, each communication means (a communication line, a communication network, a communication module) for transmitting and receiving commands and data between components is illustrated by a broken line. The communication means includes, for example, a LAN (Local Area Network), a SAN (Storage Area Network), Internet, a public communication network, a leased line, a bus, a switch, a network switch (a switch hub, a FC (Fibre Channel) switch and the like), a cross bar switch, etc.

The host computer 2 includes, for example, a personal computer, an office computer, and a main frame. FIG. 1B illustrates an example of a computer (information apparatus) usable as the host computer 2. A computer 60 includes a CPU 61, a volatile or nonvolatile memory 62 (RAM or ROM), a storage device 63 (a hard disk drive, a semiconductor storage device (SSD (Solid State Drive)), an input device 64 such as a keyboard, a mouse or the like, an output device 65 such as a liquid crystal monitor, a printer, or the like, and a communication interface 66 such as a NIC, HBA or the like.

Communication between the host computer 2 and the storage apparatus 10-1 is performed using a protocol such as TCP/IP, FICON (registered trademark) (Fibre Connection), ESCON (registered trademark) (Enterprise System Connection), ACONARC (trademark) (Advanced Connection Architecture), FIBARC (registered trademark) (Fibre Connection Architecture) and the like. The host computer 2 transmits an I/O request (a data read request, a data write request) to the storage apparatus 10 in the unit of a block, for example.

The storage apparatus 10 is, for example, a disk array apparatus. The storage apparatus includes a plurality of channel adapters (hereinafter referred to as CHA 11 (Channel Adapter)), a plurality of storage device controllers (hereinafter referred to as DKA 12 (Disk Adapter)), a cache memory (hereinafter referred to as CM 13 (Cache Memory)), a shared memory (hereinafter referred to as SM 14 (Shared Memory)), and a storage device 15. Note that the configuration of the storage apparatus 10 is not limited to one illustrated in this figure. For example, the storage apparatus 10 may be configured to have a function that corresponds to a data transfer processor of CHA 11 and DKA 12 (e.g., a function of a DMA (Direct Memory Access) processor), as a board (microprocessor package) that is different from CHA 11 or DKA 12.

Though FIG. 1A specifically describes only the configuration of the first storage apparatus 10-1, the second storage apparatus 10-2 also have the configuration same as or similar to that of the first storage apparatus 10-1. The second storage apparatus 10-2 is used, for example, to expand storage capacity of the first storage apparatus 10-1.

Upon reception of an I/O request from the host computer 2, the CHA 11 transmits an I/O command (data read command or data write command) to the DKA 12. At the time of processing the I/O command, delivery of data between the CHA 11 and the DKA 12 (data read from the storage device or data to be written to the storage device 15) is performed via the CM 13, and reading and writing to and from the CM 13 is performed at any time. When executing the I/O request, the CHA 11 transmits a response (read data, a read completion report, a write completion report, and the like) to the host computer 2.

FIG. 1C illustrates a hardware configuration of the CHA 11. As illustrated in the figure, the CHA 11 includes a processor (hereinafter referred to as a MP 111), a local memory (hereinafter referred to as a LM 112), an external communication interface 113, an internal communication interface 114, and a timer 115 (for example, a timer including RTC (Real Time Clock) or the like).

The MP 111 includes, for example, a CPU (Central Processing Unit), a MPU (Micro Processing Unit), or a DMA processor. The MP 111 executes processing of data transmission and reception between an external apparatus (host computer 2, second storage apparatus 10-2) and itself under protocol control.

The LM 112 includes a RAM (Random Access Memory) or a ROM (Read Only Memory). LM 112 stores a program to be executed by the MP 111 and data to be referred to by the MP 11, for example.

The external communication interface 113 includes, for example, an NIC (Network Interface Card) or a HBA (Host Bus Adapter). The external communication interface 113 performs communications with the host computer 2 and the second storage apparatus 102 according to a communication standard such as Ethernet (trademark), Fiber Channel, or the like. The internal communication interface 114 communicates with the DKA 12, CM 13 and SM 14.

The DKA 12 reads data from the storage device 15 and writes data to the storage device 15 in response to the I/O command from the CHA 11. The DKA 12 performs a processing on staging data stored in the CM 13 (reading data from the storage device 15) and destaging (writing data to the storage device 15).

FIG. 1D illustrates a hardware configuration of the DKA 12. As illustrated in the figure, the DKA 12 includes a processor (hereinafter referred to as a MP 121), a local memory (hereinafter referred to as a LM 122), an internal communication interface 123, storage device interface 124, and a timer 125 (for example, a timer including RTC (Real Time Clock) or the like).

The MP 121 includes, for example, a CPU, an MPU, or a DMA. The MP 121 executes a processing of data transmission and reception with the CHA 11, the CM 13, the SM 14 and the storage device 15.

The LM 122 includes a RAM or a ROM. LM 122 stores, for example, a program to be executed by the MP 121 and data to be referred to by the MP 121. The internal communication interface 123 communicates with the CHA 12, the CM 13 and the SM 14. The storage device interface 124 communicates with the storage device 15.

The CM 13 includes, for example, a RAM accessible at high speed. In the CM 13, data to be written in the storage device 15 (hereinafter described to as write data) and data to be read from the storage device 15 (hereinafter described to as read data), for example, are stored (i.e. staged). In the SM 14, information for controlling the storage apparatus 10, for example, is stored.

The storage device 15 includes, for example, a hard disk drive (disk drive) or a semiconductor storage device (SSD (Solid State Drive)). In the present embodiment, it is assumed that the storage device 15 is the hard disk drive. Further, it is assumed that a plurality of hard disk drives are present and they are controlled according to the procedure of RAID (Redundant Arrays of Inexpensive (or Independent) Disks) (for example, RAID levels 0, 1, 5). The storage device 15 provides a storage area based on a storage device (hereinafter referred to as LDEV (Logical Device) that includes a storage area (for example, a storage area of a RAID group) provided by the RAID.

=Method for Providing Storage Area=

FIG. 2 illustrates a method in which the first storage apparatus 10-1 provides a storage area to the host computer 2. This mechanism is achieved by the CHA 11 and DKA 12 appropriately managing management information stored in the CHA 11, DKA 12 and SM 14. Note that a character of "#" used in the following explanation indicates an identifier (for example, a number sequentially assigned).

The host computer 2 can access a normal LDEV (hereinafter referred to as a N-LDEV 201 (N: Normal) (real logical device)) or an LDEV (hereinafter referred to as a DP-LDEV 203) of a volume (hereinafter referred to as a DP-VOL 204) provided by a storage pool 208 (storage pool in dynamic provisioning (DP)).

A relationship (correspondence) between the DP-LDEV 203 and a LDEV (hereinafter referred to as POOL-LDEV 207) included in the storage pool 208 is managed by a DP-VOL management table 210 illustrated in FIG. 2. N-LDEV 201 and each of POOL-LDEV 207 included in the storage pool 208 are made to correspond to virtual storage devices (hereinafter referred to as VDEV 205 (Virtual Device) which are management units of the storage area on the CM 13 side. A correspondence between N-LDEV 201 or POOL-LDEV 207 and the VDEV 205 is managed by a VDEV management table 220 illustrated in FIG. 2. Note that both the DP-VOL management table 210 and the VDEV management table 220 are stored in the SM 14.

FIG. 3A is a view explaining relationship between the VDEV 205 and the N-LDEV 201, or between VDEV 205 and POOL-LDEV 207. As illustrated in FIG. 3A, the VDEV management table 220 has VDEV unique information 310 and LDEV unique information 320. Of these, the VDEV unique information 310 manages, for each VDEV 205 (VDEV #), a head LDEV # of N-LDEV 201 or POOL-LDEV 207 included in the VDEV 205, the number of LDEVs included in the VDEV 205 (i.e. number of devices), an identifier of the head storage device 15 included in N-LDEV 201 or POOL-LDEV 207 (i.e. storage device #), the number of storage devices 15 included in the N-LDEV 201 or POOL-LDEV 207 (i.e. number of devices), and a storage area size of the VDEV 205.

Meanwhile, the LDEV unique information 320 manages, for each N-LDEV 201 or POOL-LDEV 207 (LDEV #), a storage area size of the N-LDEV 201 or POOL-LDEV 207, a VDEV 205 (VDEV #) to which the N-LDEV 201 or POOL-LDEV 207 belongs, a configuration position of the N-LDEV 201 or POOL-LDEV 207 in the VDEV 205 (VDEV #) to which the N-LDEV 201 or POOL-LDEV 207 belongs (i.e. intra-VDEV address (an address in VDEV)), and a subsequent N-LDEV 201 or POOL-LDEV 207 (LDEV #) included in the VDEV 205 to which the N-LDEV 201 or POOL-LDEV 207 belongs.

FIG. 3B illustrates the relationship between the VDEV 205 and the N-LDEV 201 or POOL-LDEV 207 on the basis of storage devices 15 (#E0 and #E1) of the second storage apparatus 10-2. The relationship between each VDEV 205 and the storage device 15 (#E0, #E1) of the second storage apparatus 10-2 is managed by a coupling management table 330 in which a VDEV 205 (VDEV #), a communication port number of the CHA 11 in the first storage apparatus 10-1, a WWN of a communication port of the second storage apparatus 10-2, and a number of a logical volume provided by the second storage apparatus 10-2 (i.e. LU number) are made to correspond to one another. The coupling management table 330 is managed by the CHA 11 and the SM 14. Similarly to what is shown in FIG. 3A, information of the VDEV 205 is managed as VDEV unique information 310. Further, information on N-LDEV 201 or POOL-LDEV 207 is managed as LDEV unique information 320.

=Management of Storage Area=

An explanation will be next given of a method for managing the storage area in the storage apparatus 10. FIG. 4A illustrates an example of the DP-VOL management table 210. As illustrated in the figure, the DP-VOL management table 210 includes a first table 211 and a second table 212. Of these, the first table 211 includes multiple records having items of a DP-LDEV 2111, a start position 2112 and a PSCB#2113.

An identifier (DP-LDEV#) of the DP-LDEV 203 is set to the DP-LDEV 2111 of the DP-VOL management table 210. A start position (head address) of a unit area (corresponding to a size of later-described PSCB) of the DP-LDEV 203 is set to the start position 2112. An identifier (a number in case of the present embodiment) of a PSCB (Pool Slot Control Block) is set to the PSCB#2113. Note that the PSCB corresponds to an area (hereinafter referred to as a virtual unit area) obtained by dividing the storage area provided by the storage pool 208 into a fixed size. The virtual unit area is a management unit of the storage area of the storage pool 208. The PSCBs are managed by being coupled in a list form.

The second table 212 includes multiple records having items of a PSCB#2121, a subsequent PSCB#2122, a preceding PSCB#2123, POOL-LDEV 2124, an N-LDEV 2124, a start position 2125, and the number of links 2126. The aforementioned PSCB is set to the PSCB#2121 among these. A number (PSCB#) of the PSCB coupled to the back side of the PSCB in the aforementioned list is set to the subsequent PSCB#2122. A number (PSCB#) of the PSCB coupled to the front side of the PSCB in the aforementioned list is set to the preceding PSCB#2123. An identifier (N-LDEV#) of the N-LDEV 201 is set to the POOL-LDEV 2124. A start position (head address) of the PSCB is set to the start position 2125. A value indicating degree of data redundancy is set to the number of links 2126. Note that details on the degree of redundancy will be described later.

As illustrated in FIG. 4A, the record of the first table 211 and that of the second table 212 are made to correspond to each other according to the content (PSCB#) of the PSCB 2113 in the first table 211 and the content (PSCB#) of the PSCB 2121 in the second table 212 (where PSCB# in both tables match each other).

FIG. 4B is an example of a used queue management table 410 that manages a PSCB in use. The used queue management table 410 has items of a head PSCB#4101 in which a number (PSCB#) of a head PSCB in the list, where PSCBs in use are coupled, is set, and an end PSCB#4102 in which an end PSCB# is set.

FIG. 4C is an free queue management table 420 that manages a PSCB which is not in use (free). The free queue management table 420 has items of a head PSCB#4201 of the list, where free PSCBs are coupled, and an end PSCB#4202. Both the used queue management table 410 and the free queue management table 420 are stored in the SM 14. They are appropriately referred to by the CHA 11 or the DKA 12.

When an I/O request (data write request or data read request) to the DP-VOL 204 occurs, the CHA 11 acquires a PSCB# stored in a head PSCB (head PSCB#4201) among free PSCBs with reference to the free queue management table 420, and stores data (write data or read data) serving as an I/0 request target in a PSCB specified by the acquired PSCB#.

After storing data, the CHA 11 stores a PSCB# of a subsequent PSCB in a head PSCB#4201 of the free queue management table 420 (deletes the head of the list) and stores a PSCB# of the PSCB used in the current I/O request in an end PSCB#4102 of the used queue management table 410 (couples to the end of the list).

For example, when an I/O request occurs in a state illustrated in FIGS. 4A to 4C, each of contents of the DP-VOL management table 210, the used queue management table 410 and the free queue management table 420 is changed to a state each illustrated in FIGS. 5A to 5C.

=Management of CM 13=

An explanation will be next given of a method for managing data stored in CM 13. A CM management table 600, which manages a correspondence between the storage area of the VDEV 205 and that of the CM 13, is stored in the SM 14.

FIG. 6A illustrates an example of the CM management table 600. As illustrated in FIG. 6A, the CM management table 600 has a third table 601 and a fourth table 602. Of these, the third table 601 includes multiple records having items of a VDEV#6011, a start position 6012 and a SLCB#6013. An identifier (VDEV#) of the VDEV 205 is set to the VDEV#6011. A start position (head address) of a unit area of the VDEV 205 is set to the start position 6012. An identifier (a number in case of the present embodiment) of a SLCB (Slot Control Block) is set to the SLCB#6013. Note that the SLCB is an area (hereinafter referred to as a real unit area) obtained by dividing the storage area of the CM 13 into a suitable unit size (hereinafter referred to as a unit cache area). The SLCB is a management unit of the CM 13. The SLCBs are managed by being coupled to each other in a list form.

The fourth table 602 includes multiple records having items of a SLCB#6021, a subsequent SLCB#6022, a preceding SLCB#6023, a VDEV#6024, a start position 6025, and a queue type 6026. Of these, the SLCB is set to the SLCB#6021. A number (SLCB#) of a SLCB coupled to the back side of the SLCB in the aforementioned list is set to the subsequent SLCB#6022. A number (SLCB#) of a SLCB coupled to the front side of the SLCB in the aforementioned list is set to the preceding SLCB#6023. An identifier (VDEV#) of the VDEV 205 is set to the VDEV#6024. A start position (head address) of the SLCB is set to the start position 6025.

Information indicating the type of data queue which manages SLCB is set to the queue type 6026. Each SLCB belongs to either of a clean queue, a dirty queue and a free queue. Among these, in the clean queue, registered is a SLCB which stores data on which destaging from the CM 13 is completed (i.e. data that is synchronized with data stored in the storage device 15; hereinafter referred to as clean data). In the dirty queue, registered is a SLCB which stores data on which destaging from the CM 13 is uncompleted (i.e. data that is not synchronized with (does not have the same content as) data stored in the storage device 15; hereinafter referred to as dirty data). In the free queue, an SLCB not in use (SLCB where no meaningful data is stored) is registered. The clean queue, the dirty queue, and the free queue are managed by, for example, the CHA 11, the DKA 12, the CM 13 or the SM 14. When the SLCB is registered in the clean queue, "C" (Clean) is set to the queue type 6026. When the SLCB is registered in the dirty queue, "D" (Dirty) is set therein. When the SLCB is registered in the free queue, "F" (Free) is set therein.

As illustrated in FIG. 6A, the record in the third table 601 and that in the fourth table 602 are made to correspond to each other according to a value of the PSCB 6013 in the third table 601 and that of the PSCB 6021 in the fourth table 602.

FIG. 6B is a clean queue management table 610 that manages a clean queue. The clean queue management table 610 includes items of a head SLCB#6101 in which a number (SLCB#) of a head SLCB of the clean queue is set and an end SLCB#6102 in which a SLCB# at the end of the clean queue is set.

FIG. 6C is a dirty queue management table 620 that manages a dirty queue. The dirty queue management table 620 includes items of a head PSCB#6201 in which a number (SLCB#) of a head SLCB of the dirty queue is set and an end SLCB#6202 in which a SLCB# at the end of the dirty queue is set.

FIG. 6D is a free queue management table 630 that manages a free queue. The free queue management table 630 includes items of a head SLCB#6301 in which a number (SLCB#) of a head SLCB of the free queue is set and an end SLCB#6302 in which a SLCB# at the end of the free queue is set.

Note that all of the clean queue management table 610, the dirty queue management table 620 and the free queue management table 630 are managed in the SM 14. They are appropriately referred to by the CHA 11 or the DKA 12.

A specific explanation will be next given of a management method for CM 13, which is achieved by using the aforementioned tables.

For example, in a case where the contents of the respective tables are as illustrated in FIGS. 6A to 6C, when data is written to an area where VDEV 6011# of a VDEV 205 is "0" and a start position 6012 of the VDEV 205 is "0," a SLCB (SLCB where SLCB#6013 is "0") which corresponds to the area is registered in the dirty queue. The content of the head SLCB#6101 of the clean queue management table 610 and the content of the end SLCB#6202 of the dirty queue management table 620 are also changed. Consequently, the contents of the tables become as illustrated in FIGS. 7A to 7C.

Next, when data is read from an area where the VDEV 6011# of the VDEV 205 is "1" and a start position 6012 of the VDEV 205 is "12," for example, a SLCB where the SLCB#6013 registered in the free queue is "5" is used and deleted from the free queue (the head of the free queue results in the SLCB where SLCB# is "6") and the SLCB is registered in the clean queue. As a result, the contents of the tables become as illustrated in FIGS. 8A to 8C.

Figure 9A:
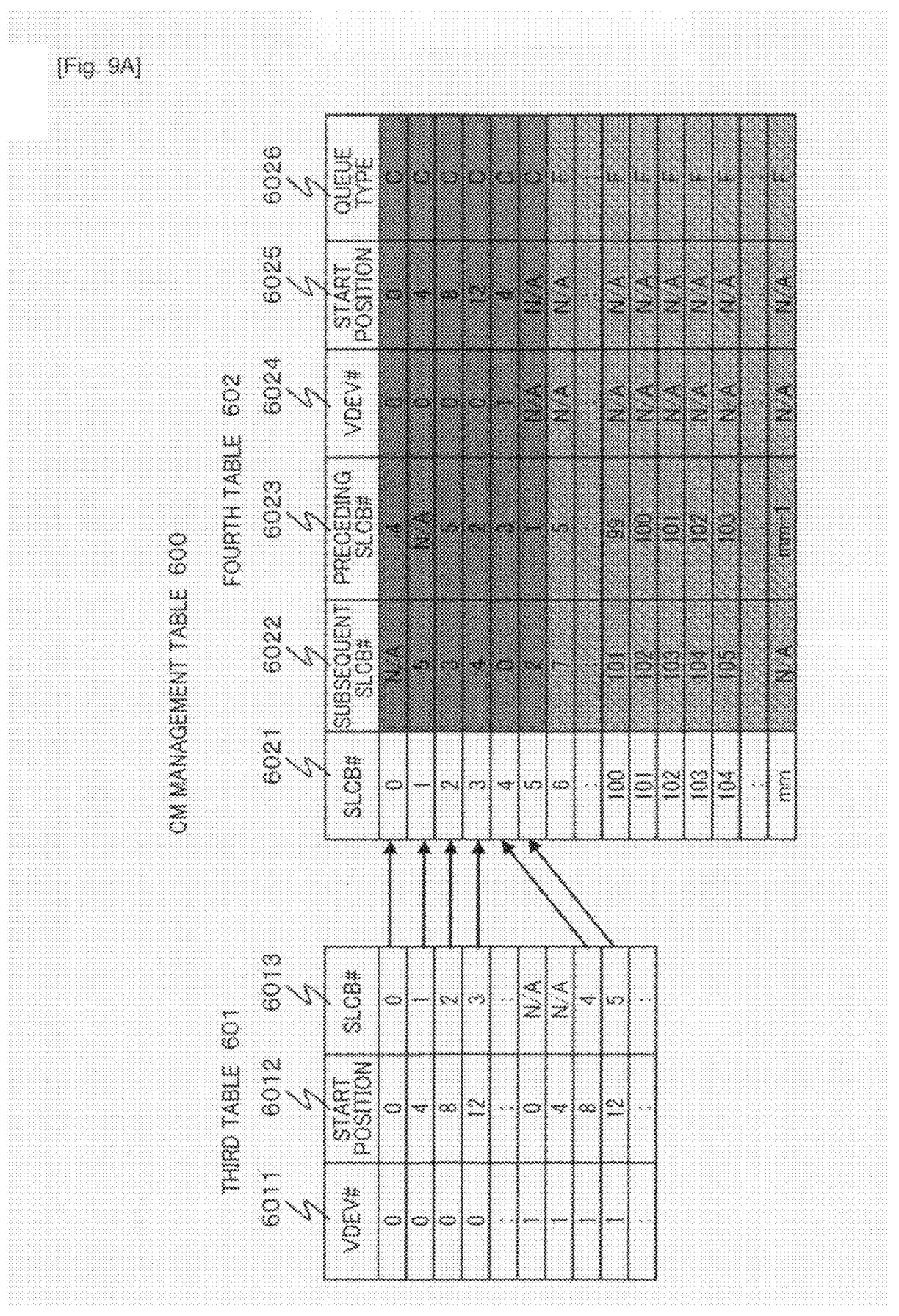

When a destage processing is executed and dirty data is all changed to clean data, the contents of the respective tables are as illustrated in FIGS. 9A to 9D.

Further, when the capacity of the CM 13 becomes insufficient and the need arises to reserve a free SLCB, a processing (hereinafter referred to as free collection processing) of converting the SLCB which stores clean data into a free SLCB is executed. When a free collection processing is executed, the SLCB which stores clean data is changed to the free SLCB, and the contents of the tables become as illustrated in FIGS. 10A to 10D.

=Redundancy Elimination Function=

An explanation will be next given of a function of the first storage apparatus 10 (hereinafter referred to as redundancy elimination function) for preventing the same data from being redundantly stored in different unit areas of the POOL-LDEV 207. When data stored in one PSCB of the DP-LDEV 203 is the same as data stored in a different PSCB of the DP-LDEV 203, the CHA 11 of the first storage apparatus 10 performs management such that the same PSCB is assigned to the unit areas of the corresponding DP-LDEV 203. FIG. 11A illustrates one example of the DP-VOL management table 210 that performs such management. In addition, FIG. 11B and FIG. 11C illustrate examples of the used queue management table 410 and the free queue management table 420, which are associated with the state illustrated in FIG. 11A.

In FIG. 11A, the content of the PSCB where PSCB#2113 is "0" is the same as that of the PSCB where PSCB#2113 is "3." Therefore, the PSCB where PSCB#2113 is "3" is released (the PSCB is changed to an unused (free) state), and the unit area of the DP-LDEV 203 where LDEV#2111 is "0" and the start position 2112 of the DP-LDEV 203 is "12" is made to correspond to a PSCB where PSCB#2113 is "0." Further, "2" is stored in the number of links 2126 of the second table 212 to manage the fact that the PSCB where PSCB#2113 is "0" is made to correspond to two different unit areas of the DP-LDEV 203. Furthermore, since the PSCB where PSCB#2113 is "3" has been released, "3" is stored in the end PSCB#4202 of the free queue management table 420, as illustrated in FIG. 11C.

Thus, the redundancy elimination is performed by making a plurality of virtual unit areas (PSCBs) having the same data stored correspond to the same unit cache area (SLCB).

=Function and Data=

FIG. 3C collectively illustrates major functions of the aforementioned storage apparatus 10 and major tables which are managed by the storage apparatus 10. The functions of the storage apparatus 10 are achieved when the CHA 11 or DKA 12 executes a program stored in the MP 111 or MP 121.

As illustrated in FIG. 3C, the storage apparatus 10 includes an I/O processing unit 511, a DP-VOL management unit 512 (virtual logical device management unit), a pool management unit 513, a VDEV management unit 514 (real logical device management unit), and a N-LDEV management unit 515. The storage apparatus 10 manages a VDEV management table 220 (VDEV unique information 310, LDEV unique information 320), a DP-VOL management table 210 (first table 211 and second table 212), a used queue management table 410, a free queue management table 420, a CM management table 600, a clean queue management table 610, a dirty queue management table 620, and a free queue management table 630.

The I/O processing unit 511 controls the CHA 11 and the DKA 12, to thereby receive an I/O request (a data read request or a data write request) from the host computer 2, to read data from the storage device 15 or write data to the storage device 15 in response to the I/O request, and to send the host computer 2 a response of a processing result of the I/O request (transmission of read data, read completion notification, write completion notification, etc).

The DP-VOL management unit 512 generates a DP-VOL 204 from the storage pool 208 by use of the DP-VOL management table 210. The pool management unit 513 supplies the POOL-LDEV 207 to the storage pool 208 by use of the VDEV management table 220. The VDEV management unit 514 manages the VDEV management table 220. The N-LDEV management unit 515 provides the N-VOL 201 to the host computer 2 by use of the VDEV management table 220.

=Explanation of Processing=

An explanation will be next given of processing performed by the storage apparatus 10 with reference to the drawings. It should be noted that a letter "S" added before a reference numeral means a processing step in the following explanation.

<Read Processing>

FIG. 12A is a flowchart explaining a processing (hereinafter referred to as read processing S1200) performed by the first storage apparatus 10-1 when receiving a data read request (hereinafter referred to as Read request) as an I/O request from the host computer 2. A Read processing S1200 is executed mainly by the CHA 11.

The outline of the Read processing S1200 is as follows: When a Read request from the host computer 2 is received, the CHA 11 allocates a PSCB and a SLSB for the Read request, and stores read data in the area of the CM 13 corresponding to the allocated SLCB. When the SLCB cannot be reserved in the CM 13, the CHA 11 waits for transition from the clean queue to the free queue. The following will specifically explain the Read processing S1200.

First, in S1211 of FIG. 12A, the CHA 11 receives a read request from the host computer 2.

In S1212, the CHA 11 judges whether a read target volume specified by the received Read request includes a DP-LDEV 203 or N-LDEV 201. If the read target volume is judged to include DP-LDEV 203 (S1212: DP-LDEV), the processing goes to S1213, and if the read target volume is judged to include the N-LDEV 201 (S1212: N-LDEV), the processing goes to S1219.

In S1213, the CHA 11 searches a first table 211 of the DP-VOL table 210 using as keys a LDEV# of the DP-VOL 204 specified by the Read request and a read target address, and judges whether a PSCB is allocated to the area of the DP-VOL 204 where read data is stored (S1214). If the PSCB is not allocated (S1214: NO), the processing goes to S1215, and if the PSCB is allocated (S1214: YES), the processing goes to S1217.

In S1215, the CHA 11 executes a PSCB allocation processing (S1215) and allocates the PSCB to the read target area. Note that details on the PSCB allocation processing S1215 will be described later.

In S1216, the CHA 11 registers a PSCB# of the allocated PSCB in a PSCB#2113 of the corresponding record in the DP-VOL management table 210.

In S1217, the CHA 11 acquires a LDEV#2124 and a start position 2125 (intra-LDEV address (an address in LDEV)) of the POOL-LDEV 207, corresponding to the PSCB allocated to the read target area (PSCB#), from the second table 212 of the DP-VOL management table 210.

In S1218, the CHA 11 acquires a VDEV# and an intra-VDEV address, corresponding to the acquired LDEV# and the intra-LDEV address, from the VDEV management table 220.

If the read target volume is judged to include the N-LDEV 201 in S1212 (S1212: N-LDEV), the CHA 11 acquires a VDEV# and an intra-VDEV address, corresponding to the LDEV# and the read target address specified by the data read request, from the LDEV unique information 320 of the VDEV management table 220 (S1219). After that, the processing goes to S1220.

In S1220, the CHA 11 uses the VDEV# and the intra-VDEV address as keys to search the CM management table 600 for a SLCB# which corresponds to the keys.

In S1221, the CHA 11 judges whether or not a SLCB is allocated to the area of the VDEV 205 where read data is stored. If a SLCB is not allocated (S1221: NO), the processing goes to S1222 and if a SLCB is allocated (S1221: YES), the processing goes to S1225.

In S1222, the CHA 11 executes a SLCB allocation processing. Details on the SLCB allocation processing S1222 will be described later.

In S1223, the CHA 11 judges the content of a return value of the SLCB allocation processing. If the return value is "wait" (S1223: YES), the processing is ended. If the return value is not "wait" (S1223: NO), the processing goes to S1224.

In S1224, the CHA 11 registers a SLCB# of the allocated SLCB in the appropriate record.

In S1225, the CHA 11 acquires a queue type of the SLCB allocated to the area of the VDEV 205 from the fourth table 602 of the CM management table 600, and judges the content of the acquired queue type. If the queue type is "free queue" (S1225: free), the processing goes to S1226, and if the queue type is "dirty queue or clean queue" (S1225: dirty or clean), the processing goes to S1230.

In S1226, the CHA 11 judges whether the VDEV 205, where data stored in the SLCB is written, is included in the storage device 15 (hereinafter referred to as an internal storage device) of the first storage apparatus 10-1 or in the storage device 15 (hereinafter referred to as an external storage device) of the second storage apparatus 10-2, with reference to the VDEV management table 220.

If the VDEV 205 is included in the internal storage device (S1226: internal), the CHA 11 reads (acquires) real data from the internal storage device (a RAID group based on the storage devices 15 (#0 to 3) in case of the present embodiment) (S1227). On the other hand, if the VDEV 205 is included in the external storage device (S1226: external), the CHA 11 reads (acquires) real data from the corresponding external storage device (the storage device 15 (#E0 or #E1)) (S1228).

In S1229, the CHA 11 stores the acquired real data in the SLCB of the CM 13.

In S1230, the CHA 11 executes a clean queue transition processing. Details on the clean queue transition processing in S1230 will be described later.

In S1231, the CHA 11 transmits read real data to the host computer 2.

FIG. 12B is a flowchart explaining details on a PSCB allocation processing S1215 shown in FIG. 12A.

First, the CHA 11 saves a PSCB# stored in the head PSCB#4201 of the free queue management table 420 in a buffer (S12151), and sets a subsequent (second) PSCB# to the head PSCB#4201 (S12152).

Next, the CHA 11 sets the saved PSCB# as the end PSCB#4102 of the used queue management table 410 (S12153).

Next, the CHA 11 increments by 1 a value of the number of links 2126 of the second table 212 of the DP-VOL management table 210 corresponding to the PSCB# saved in the buffer in S12151 (S12154).

In S12155, the CHA 11 outputs the saved PSCB#.

FIG. 12C is a flowchart explaining details on the SLCB allocation processing S1222 shown in FIG. 12A.

First, the CHA 11 judges whether or not there is a free SLCB with reference to the free queue management table 420 (S12221). If there is no free SLCB (S12221: NO), the processing goes to S12222, and if there is a free SLCB (S12221: YES), the processing goes to S12225.

In S12222, the CHA 11 executes a clean queue cutting processing. Note that details on the clean queue cutting processing S12222 will be described later.

In S12223, the CHA 11 judges a return value of the clean queue cutting processing (S12222). If the return value is "wait" (S12223: YES), the processing goes to S1224.

In S12224, the CHA 11 sets the return value of the SLCB allocation processing S1215 to "wait" and ends the processing. Thus, when no SLCB can be reserved, it results in waiting for occurrence of SLCB transitioning from the clean queue to the free queue.

In S1223, if the return value is not "wait" (S12223: NO), the processing goes to S12225.

In S12225, the CHA 11 saves a head PSCB#6301 of the free queue management table 630 in the buffer, and sets a subsequent (second) SLCB# as a head PSCB#6302 in S12226.

In S12227, the CHA 11 outputs the saved PSCB#.

In S12228, the CHA 11 sets the return value of the SLCB allocation processing S1215 to "normal" and ends the processing.

FIG. 12D is a flowchart explaining details on the clean queue transition processing S1229 shown in FIG. 12A. Note that at the time of starting the clean queue transition processing S1229, the SLCB#, VDEV# and intra-address selected at that time are given as inputs.

In S12291, the CHA 11 sets the SLCB# given as the input for the end SLCB#6102 of the clean queue management table 610.

In S12292, the CHA 11 sets "C" (Clean) in the queue type 6026 of the CM management table 600 corresponding to the SLCB# given as the input.

In S12293, the CHA 11 sets the VDEV# given as the input in the VDEV#6024 of the CM management table 600.

In S12294, the CHA 11 sets an intra-VDEV address given as an input for the start position 6024 (address in the VDEV 205) of the CM management table 600.

FIG. 12E is a flowchart explaining details on the clean queue cutting processing S12222 shown in FIG. 12C.

In S122221, the CHA 11 judges whether or not there is a clean queue. If there is no clean queue (S122221: NO), the processing goes to S122222, and the CHA 11 sets the return value to "wait" and ends the processing (in this case, waiting is performed until a clean SLCB is generated by destaging). If there is a clean queue (S122221: YES), the processing goes to S122223.

In S122223, the CHA 11 executes a processing of acquiring a SLCB to be released. Note that details on the processing S122223 of acquiring a SLCB to be released will be described later.

In S122224, the CHA 11 releases a SLCB (SLCB#) acquired in the processing S122223 of acquiring the SLCB to be released from the clean queue (updates the clean queue management table 610).

In S122225, the CHA 11 executes a SLCB free queue transition processing. Note that details on the SLCB free queue transition processing S122225 will be described later.

In S122226, the CHA 11 sets the return value to "normal" and ends the processing.

FIG. 12F is a flowchart explaining another example of the clean queue cutting processing S12222 shown in FIG. 12C.

The processing in S122221, S122222 and S122223 are the same as those in FIG. 12E. In S1222234, CHA 11 executes a processing of acquiring the number of links. The details on the processing S1222234 of acquiring the number of links will be described later.

In S122227, the CHA 11 judges whether or not the number of links acquired in the processing 1222234 of acquiring the number of links is 0, and if the number of links is not 0 (S122227: NO), the CHA 11 judges whether or not there exist data with matching contents in the POOL (S122228). Specifically, CHA 11 judges whether or not the following criteria are satisfied: the SLCB# to be released does not match a SLCB# of a noticed clean data, and data of the CM 13 of the SLCB of SLCB# to be released does not match data of the CM 13 of the SLCB of SLCB# of the noticed clean data. If satisfied (S122228: YES), CHA 11 executes a redundancy elimination processing S14147, and proceeds to S122229. If not satisfied (S122228: NO), the process goes to S122229. Note that details on the redundancy elimination processing S14147 will be described later.

In S122229, a subsequent SLCB in the clean queue is made to be the noticed SLCB (the noticed SLCB is changed), and the processing goes to S122224.

In S122230, CHA 11 judges whether or not processing for all the SLCBs in clean queues is completed. If not completed (S122230: NO), the processing returns to S1222234, and if completed (S122230: YES), the processing goes to S122224.

The processing in S122224, S122225 and S122226 are the same as those in FIG. 12E.

FIG. 12G is a flowchart explaining details on the processing S122223 of acquiring a SLCB to be released shown in FIG. 12E or FIG. 12F.

In S1222231, the CHA 11 acquires a clean queue size with reference to the clean queue management table 610.

In S1222232, the CHA 11 sets the largest number of links in the number of links 2126 of the second table 212 of the DP-VOL management table 210, as a "maximum number of links" which is a processing variable to be used in the subsequent processing.

In S1222233, the CHA 11 sets a SLCB# stored in the head SLCB#6101 of the clean queue management table 610 as a "noticed SLCB#" which is a processing variable to be used in the subsequent processing.

In S1222234, the CHA 11 executes a processing of acquiring the number of links. Note that details on the processing of acquiring the number of links S1222234 will be described later.

In S1222235, the CHA 11 judges whether or not the number of links acquired by the processing S1222234 of acquiring the number of links is "0." If the number of links is "0" (S1222235: YES), the processing goes to S1222236, and the CHA 11 outputs the SLCB# currently set as the noticed SLCB# and ends the processing (the SLCB for this SLCB# will be released).

If the number of links is not "0" (S1222235: NO), the processing goes to S1222237, and the CHA 11 judges whether or not the number of links acquired by the processing S1222234 of acquiring the number of links is smaller than the value set as the maximum number of links. If the acquired number of links is smaller than the value set as the maximum number of links (S1222237: YES), the processing goes to S1222238, and if the acquired number of links is not smaller than the value (S1222237: NO), the processing goes to S1222240.

In S1222238, the CHA 11 saves the SLCB# currently set for the noticed SLCB# as a candidate of a SLCB to be released. Then, in subsequent S1222239, the CHA 11 sets the value having been set as the maximum number of links in the number of links 2126 of the second table 212 corresponding to the SLCB# currently set as the noticed SLCB#.

In S1222240, the CHA 11 judges whether or not the processing for all the clean queues is completed. If the processing is not completed (S1222240: NO), the processing goes to S1222241, and the CHA 11 sets the noticed SLCB# as a subsequent SLCB# of the clean queue. Then, the processing goes back to S1222234. If the processing is completed (S1222240: YES), the processing goes to S1222242, and the CHA 11 outputs the SLCB# saved as the candidate of a SLCB to be released, and ends the processing.

According to the aforementioned processing, if there is a SLCB where the number of links is "0" among SLCBs, the SLCB is preferentially selected as the SLCB to be released. If there is no SLCB where number of links is "0" among SLCBs, a SLCB where the number of links is the smallest is preferentially selected as the SLCB to be released. Namely, in the above processing, the SLCB where the number of used PSCBs is smaller is preferentially selected as the SLCB to be released, and therefore it is possible to minimize an influence upon a processing performance due to release.

FIG. 12H is a flowchart explaining another example of a processing S122223 of acquiring a SLCB to be released shown in FIG. 12E.

In S1222245, the CHA 11 acquires the SLCB# having been set as the head SLCB#6101 of the clean queue management table 610, and outputs the SLCB#.

In S1222246, the CHA 11 sets the return value to 0.

FIG. 12I is a flowchart explaining details on a SLCB free queue transition processing S122225 illustrated in FIG. 12E. Note that at the time of starting the SLCB free queue transition processing S122225, the SLCB# of a SLCB to be transitioned to the free queue is given as an input.

In S1222251, the CHA 11 sets the SLCB# given as an input in the end SLCB#6302 of the free queue management table 630.

In S1222252, the CHA 11 sets "F" (Free) in the queue type 6026 of the fourth table 602 of the CM management table corresponding to the SLCB# given as the input.

In S1222253, the CHA 11 searches the fourth table 602 using as keys the VDEV#6011 and the start position 6012 (intra-VDEV address), which correspond to the SLCB# given as the input from the third table 601. In subsequent S1222254, the CHA 11 sets "N/A" to (i.e. releases) the subsequent SLCB#6022, the preceding SLCB#6023, the VDEV#6024 and the start position 6025 of the corresponding record.

FIG. 12J is a flowchart explaining details on the processing S1222234 of acquiring the number of links shown in FIG. 12F. Note that at the time of starting the processing, the noticed SLCB# having been set in S1222233 in FIG. 12F is given as an input.

In S12222341, the CHA 11 executes a processing of acquiring LDEV# and intra-LDEV address from SLCBs except the free SLCB. Note that details on the processing S12222341 of acquiring LDEV# and intra-LDEV address from SLCBs except the free SLCB will be described later.

In S12222342, the CHA 11 judges whether or not the LDEV specified by the LDEV# acquired in S1222241 is included in the DP-VOL 204. When the LDEV is not included in the DP-VOL 204 (S12222342: NO), the processing goes to S12222343, and the CHA 11 sets the number of links (output variable of the processing) to "0".

When the LDEV is included in the DP-VOL 204 (S12222342: YES), the process goes to S12222344, and the CHA 11 acquires a PSCB#2113 which corresponds to the LDEV# and the intra-LDEV address acquired in S12222341, from the first table 211 of the DP-VOL management table 210. In S12222345, the CHA 11 judges whether or not "N/A" is set in the acquired PSCB#2113. If "N/A" is set (S12222345: YES), the processing goes to S12222346, and the CHA 11 sets the number of links (output variable of the processing) to "0".

If "N/A" is not set (S12222345: NO), the processing goes to S12222347, and the CHA 11 sets the number of links stored in the number of links 2126 of the second table 212 of the DP-VOL management table 210 corresponding to the PSCB# acquired in S12222344, in the number of links (output variable of the processing).

In S12222348, the CHA 11 outputs the value having been set in the number of links (output variable of the processing) as the number of links obtained by the processing.

FIG. 12K is a flowchart explaining details on a processing S12222341 for acquiring LDEV# and intra-LDEV address from SLCBs except the free SLCB LDEV# shown in FIG. 12I. Note that at the time of starting the processing, the noticed SLCB# having been set in S1222233 in FIG. 12F is given as an input.

First, in S122223411, the CHA 11 acquires a VDEV# and an intra-VDEV address, corresponding to the SLCB# (SLCB) given as an input, from the third table 601 of the CM management table 600.

In S122223412, the CHA 11 acquires a head LDEV#, which corresponds to the acquired VDEV#, from the VDEV unique information 310 of the VDEV management table 220.

In S122223413, the CHA 11 sets the head LDEV# acquired from the VDEV unique information 310 as a LDEV to be noticed (hereinafter referred to as a noticed LDEV).

In S122223414, the CHA 11 acquires an intra-VDEV address and size information of the LDEV# of the noticed LDEV from the LDEV unique information 320.

In S122223415, the CHA 11 determines whether or not the intra-VDEV address acquired from the SLCB of the input SLCB# is in a range of the addresses of the VDEV corresponding to the noticed LDEV. If the intra-VDEV address is in the range (S122223415: YES), the processing goes to S122223416, and the CHA 11 outputs the noticed LDEV# and the intra-LDEV address and ends the processing.

If the intra-VDEV address is not in the range (S122223415: NO), the processing goes to S122223417. In S122223417, the CHA 11 acquires a LDEV# subsequent to the noticed LDEV# from the LDEV unique information 320. Then, in S122223418, the CHA 11 changes the noticed LDEV# to the acquired subsequent LDEV# and proceed to S122223415.

<Write Processing>

FIGS. 13A and 13B are flowcharts explaining processing (hereinafter referred to as write processing S1300) that the first storage apparatus 10-1 performs when receiving a data read request (hereinafter referred to as a Write request) as an I/O request from the host computer 2. A Write processing S1300 is executed mainly by the CHA 11.

The outline of the Write processing S1300 is as follows: When a Write request from the host computer 2 is received, the CHA 11 allocates a PSCB and a SLSB in response to the Write request, reads data stored in a write destination of the storage device 15, stores the data in the area of the CM 13 corresponding to the allocated SLCB, and writes the write data having been received along with the Write request to the area. Note that if the SLCB is allocated to multiple PSCBs (in the case where the number of links is except 0), a combination of PSCB and SLCB is newly allocated and writing is performed to the newly allocated SLCB. The following will specifically explain the Write processing.

First, in S1311 in FIG. 13A, the CHA 11 receives a Write request from the host computer 2.

In S1312, the CHA 11 judges whether a write target volume specified by the Write request includes a DP-LDEV 203 or a N-LDEV 201. If the write target volume includes the DP-LDEV 203 (S1312: DP-LDEV), the processing goes to S1313, and if the write target volume includes the N-LDEV 201 (S1312: N-LDEV), the processing goes to S1321.

In D1313, the CHA 11 searches a first table 211 of the DP-VOL management table 210 using as keys a LDEV# and a write target address of the DP-VOL 204 specified by the Write request. Then, the CHA 11 judges whether or not a PSCB is allocated in an area of the DP-VOL 204 as a write target (S1314). If PSCB is not allocated (S1314: NO), the processing goes to S1315, and if the PSCB is allocated (S1314: YES), the processing goes to S1317.

In S1315, the CHA 11 executes a PSCB allocation processing S1215 to allocate the PSCB to the read target area. Note that details on the PSCB allocation processing S1215 are the same as those on the processing in the case of the Read request illustrated in FIG. 12B.

In S1316, the CHA 11 registers a PSCB# of the allocated PSCB to the PSCB#2113 of corresponding record of the DP-VOL management table 210.

In S1317, the CHA 11 acquires the number of links having been set in the number of links 2126 of the allocated PSCB (PSCB#) from the second table 212 of the DP-VOL management table 210. Then the CHA 11 judges whether or not the acquired number of links is 2 or more. If the acquired number of links is 2 or more (S1317: YES), the CHA 11 decrements by 1 the number of links having been set in the number of links 2126 and saves the fact that the decrement was executed (S1318). If the acquired number of links is less than 2 (S1317: NO), the processing goes to S1319.

In S1319, the CHA 11 acquires a LDEV#2124 and a start position 2125 of the POOL-LDEV 207, corresponding to the PSCB (PSCB#) allocated to the write target area, from the second table 212 of the DP-VOL management table 210.

In S1320, the CHA 11 acquires a VDEV# and an intra-VDEV address, corresponding to the acquired LDEV# and the intra-LDEV address, from the LDEV unique information 320 of the VDEV management table 220.

On the other hand, if the write target volume is judged to include the N-LDEV 201 (S1312: N-LDEV) in S1312, the CHA 11 acquires a VDEV# and an intra-VDEV address, corresponding to the LDEV# and the write target address specified by the Write request, respectively, from the LDEV unique information 320 of the VDEV management table 220 (S1321). After that, the processing goes to S1322.

In S1322, the CHA 11 searches for the corresponding SLCB# from the CM management table 600 using the VDEV# and the intra-VDEV address as keys.

In S1323, the CHA 11 judges whether or not a SLCB is allocated to the area of the VDEV 205 as a write target. When SLCB is not allocated (S1323: NO), the processing goes to S1324, and if the SLCB is allocated (S1323: YES), the processing goes to S1327.

In S1324, the CHA 11 executes a SLCB allocation processing. Note that details on the SLCB allocation processing S1324 are the same as those on the processing in the case of the Read request illustrated in FIG. 12C.

In S1325, the CHA 11 judges the content of the return value of the SLCB allocation processing. If the return value is "wait" (S1325: YES), the processing is ended. If the return value is not "wait" (S1325: NO), the processing goes to S1326.

In S1326, the CHA 11 registers the SLCB# of the allocated SLCB in the corresponding record.

In S1327, the CHA 11 acquires a queue type of the SLCB allocated to the area of the VDEV 205 from the queue type 6026 of the fourth table 602 of the CM management table 600, and judges the content of the acquired queue type. If the queue type is a free queue (S1327: free), the processing goes to S1328, and if the queue type is a dirty queue or clean queue (S1327: dirty or clean), the processing goes to S1333 in FIG. 13B.

In S1328, the CHA 11 judges whether the VDEV 205 which corresponds to the SLCB is included in the storage device 15 (hereinafter referred to as an internal storage device) of the first storage apparatus 10-1 or in the storage device 15 (hereinafter referred to as an external storage device) of the second target apparatus 10-2, with reference to the VDEV management table 220.

If the VDEV 205 includes the internal storage device (S1328: internal), the CHA 11 acquires real data from the internal storage device (a RAID group based on the storage devices 15 (#0 to 3) in case of the present embodiment) (S1329). On the other hand, if the VDEV 205 is included in the external storage device (S1328: external), the CHA 11 acquires real data from the corresponding external storage device (the storage device 15 (#E0 or #E1)) (S1330).

In S1331, the CHA 11 stores the acquired real data in the SLCB of the CM 13.

In S1332, the CHA 11 executes a clean queue transition processing. Note that details on the clean queue transition processing S1229 are the same as those on the processing in the case of the Read request illustrated in FIG. 12D.

In S1333 in FIG. 13B, the CHA 11 judges whether or not the number of links was decremented in S1318 in FIG. 13A. If the number of links was decremented (S1333: YES), the processing goes to S1334, and if the number of links was not decremented (S1333: NO), the processing goes to S1342.

In S1334, the CHA 11 executes a PCSB allocation processing. Note that details on the PSCB allocation processing S1334 are the same as those on the processing in the case of the Read request illustrated in FIG. 12B.

In S1335, the CHA 11 registers the PSCB# of the allocated PSCB in the PSCB#2113 of the corresponding record of the DP-VOL management table 210.

In S1336, the CHA 11 acquires a LDEV#2124 and a start position 2125 (intra-LDEV address) of the POOL-LDEV 207, corresponding to the PSCB (PSCB#) allocated to the write target area, from the second table 212 of the DP-VOL management table 210.

In S1337, the CHA 11 acquires a VDEV# and an intra-VDEV address, corresponding to the acquired LDEV# and the intra-LDEV address, respectively, from the VDEV management table 220.

In S1338, the CHA 11 obtains an intra-VDEV address of the write target based on the acquired VDEV# and the intra-VDEV address as well as the intra-LDEV address of the PSCB# acquired in S1334.

In S1339, the CHA 11 executes an SLCB allocation processing. Note that details on the SLCB allocation processing S1324 are the same as those on the processing in the case of the Read request illustrated in FIG. 12C.

In S1340, the CHA 11 judges the content of the return value of the SLCB allocation processing. If the return value is "wait" (S1340: YES), the CHA 11 sets the return value of the Write processing to "wait" and ends the processing (S1346). In this case, the CHA 11 transmits a "wait notification" to, for example, the host computer 2. On the other hand, if the return value is not "wait" (1340: NO), the processing goes to S1341.

In S1341, the CHA 11 sets the SLCB# allocated in S1339 for a SLCB#, in the CM management table 600, of a VDEV# and intra-VDEV address corresponding to the PSCB# allocated in S1334.

In S1342, the CHA 11 stores the content of the CM management table 600 of the SLCB# allocated immediately after S1332 in the SLCB# allocated in S1339.

In S1342, the CHA 11 executes a clean queue transition processing. Note that details on the clean queue transition processing S1342 are the same as those on the processing in the case of the Read request illustrated in FIG. 12D.

In S1343, the CHA 11 stores write data in the area of the CM 13 corresponding to the SLCB# (head SLCB# of the clean queue) allocated in S1342.

In S1344, the CHA 11 executes a dirty queue transition processing. Note that details on the dirty queue transition processing S1344 will be described later.

In S1345, the CHA 11 sets the return value to "normal". The CHA 11 transmits a "write completion notification" to, for example, the host computer 2 according to the return value. Note that write data stored in the CM 13 is written to the storage device 15 in a later-described destage processing S1400 executed at any time.

FIG. 13C is a flowchart explaining a dirty queue transition processing S1344 shown in FIG. 13B. Note that at the time of starting the processing, the SLCB#, VDEV# and intra-address set at that time are given as inputs.

In 13441, the CHA 11 sets the SLCB# given as the input to the end SLCB#6102 of the dirty queue management table 620.

In S13442, the CHA 11 sets "D" (Dirty) as the queue type 6026 of the CM management table 600 corresponding to the SLCB# given as the input.

In S13443, the CHA 11 sets the VDEV# given as the input in the VDEV#6024 of SLCB# given as the input of the CM management table 600.

In S13444, the CHA 11 sets the VDEV address, which is given as the input, to a start position 6025 (intra-VDEV address) of the input SLCB# of the fourth table 602 of the CM management table 600.

<Destage Processing>

FIG. 14A is a flowchart describing a destage processing S1400 of dirty data stored in the CM 13. Note that the destage processing S1400 is executed at the time when a predetermined scheduled time arrives, when a size of an unused area of the CM 13 becomes equal to or less than a predetermined threshold, and the like.

The destage processing S1400 is executed mainly by the DKA 12. The outline of the destage processing S1400 is as follows: In the destage processing S1400, the DKA 12 writes data of CM 13, which corresponds to the SLCB of the dirty queue, to the storage device 15. Prior to the writing, the DKA 12 makes comparison between data to be written and data of the CM 13 corresponding to the SLCB of the clean queue. If both match each other, the DKA 12 makes the PSCB of the dirty queue correspond to the SLCB of the clean queue (increments the number of links by 1) instead of writing data which correspond to the SLCB of the dirty queue to the storage device 15. The following will specifically explain the destage processing.

First, in S1411 in FIG. 14A, the DKA 12 acquires a size of the dirty queue with reference to the CM management table 600 and the dirty queue management table 620.

In S1412, the DKA 12 starts counting with a timer 125.

In S1413, the DKA 12 acquires the content of a head SLCB#6101 of the dirty queue management table 620.

In S1414, the DKA 12 executes the dirty data destage processing. Note that details on the dirty destage processing S1414 will be described later.

In S1415, the DKA 12 judges whether or not the count value of the timer 125 exceeds a threshold (i.e. whether or not time is over). If time is over (S1415: YES), the processing is ended, and if time is not over (S1415: NO), the processing goes to S1416.

In S1416, the DKA 12 judges whether or not undestaged data exists. If there exists data with destage not completed (S1416: YES), the processing goes to S1413. If there is no data with destage not completed (S1416: NO), the processing is ended.

FIG. 14B is a flowchart explaining details on a dirty data destage processing in FIG. 14A. Note that at the time of starting the processing, the SLCB# acquired in S1413 is given as an input.

In S14141, the DKA 12 executes a processing of acquiring the number of links of dirty data to acquire the number of links of dirty data. Note that details on the processing S14141 of acquiring the number of links of the dirty data are the same as those on the processing S1222234 of acquiring the number of links illustrated in FIG. 12J.

In S14142, the DKA 12 judges whether or not the number of links acquired in S14141 is "0". If the number of links is "0", the processing goes to S14150, and if the number of links is not "0," the processing goes to S14143.

In S14143, the DKA 12 executes a clean queue size acquisition processing. Note that details on the clean queue size acquisition processing will be described later.

In S14144, the DKA 12 stores the content of the head SLCB# of the clean queue management table 610 in a processing variable (hereinafter referred to as a noticed SLCB).

In S14145, the DKA 12 executes the processing of acquiring the number of links of unused data. Note that details on the processing 14145 of acquiring the number of links of unused data are the same as those on the processing 1222234 of acquiring the number of links illustrated in FIG. 12J.

In S14146, the DKA 12 judges whether or not the number of links acquired in S14145 is "0". If the number of links is "0", the processing goes to S14149, and if the number of links is not "0", the processing goes to S14147.

In S14147, the DKA 12 judges whether or not data of CM 13 of the SLCB of SLCB# of dirty data given as an input are the same as data of the CM 13 of the SLCB of SLCB# of a noticed clean data. If the above two sets of data are the same (S14147: YES), the processing goes to S14148, and the CHA 11 executes a redundancy elimination processing. Note that details on the redundancy elimination processing S14148 will be described later. On the other hand, if the above two sets of data are not the same (S14147: NO), the processing goes to S14149.

In the following S14149, DKA 12 releases the SLCB of the dirty data from the dirty queue.

In S14150, DKA 12 executes a SLCB free queue transition processing. That is, since the DKA 12 has conducted redundancy elimination in S14148, the SLCB of the dirty data having been given as an input is released. Note that the content of this processing is the same as the SLCB free queue transition processing in S122225 as illustrated in FIG. 12I. After that, the processing goes to S14155 in FIG. 14C.

In S14151, the DKA 12 resets the noticed SLCB to a subsequent SLCB# in the clean queue.

In S14152, the DKA 12 judges whether or not processing for all the SLCBs in clean queues is completed. If not completed (S14152: NO), the processing returns to S14145, and if completed (S14152: YES), the processing goes to S14155 in FIG. 14C.

In S14155, the DKA 12 judges whether a queue type 6026 of the input SLCB# is dirty. When the queue type is dirty (S14155: YES), the processing goes to S14156, and when the queue type is not dirty (S14155: NO), the processing is ended.

In S14156 in FIG. 14C, the DKA 12 acquires a LDEV# and an intra-LDEV address, corresponding to the input SLCB#, from the CM management table 600.

In S14157, the DKA 12 judges whether a VDEV 205 which corresponds to the SLCB is included in the storage device 15 (hereinafter referred to as an internal storage device) of the first storage apparatus 10-1 or in the storage device 15 (hereinafter referred to as an external storage device) of the second target apparatus 10-2, with reference to the VDEV management table 220.

If the VDEV 205 is included in the internal storage device (S14157: internal), the DKA 12 writes write data to the internal storage device (a RAID group based on the storage devices 15 (#0 to 3) in case of the present embodiment) (S14158). On the other hand, if the VDEV 205 is included in the external storage device (S14157: external), the DKA 12 writes write data to the external storage device (the storage device 15 (#E0 or #E1)) (S14159).

In S14155, the DKA 12 executes a SLCB clean queue transition processing. Note that details on the SLCB clean queue transition processing S14155 are the same as those on the processing illustrated in FIG. 12D.

FIG. 14D is a flowchart explaining details on a redundancy elimination processing S14148 shown in FIG. 14B.

In S141481, the DKA 12 executes a processing S141481 of acquiring a LDEV# and an intra-LDEV address from SLCBs except the free SLCB. Note that the DKA 12 provides a SLCB# of dirty data as an input when executing the processing. Details on the processing S141481 (dirty) of acquiring the LDEV# and intra-LDEV address from SLCBs except the free SLCB are the same as those on the processing S12222341 illustrated in FIG. 12K.

In S141482, the DKA 12 executes a processing (clean) of acquiring a LDEV# and an intra-LDEV address from SLCBs except the free SLCB. The DKA 12 provides a SLCB# of dirty data as an input when executing the processing. Note that details on the processing S141482 (clean) for acquiring the LDEV# and intra-LDEV address from SLCBs except the free SLCB are the same as those on the processing S12222341 illustrated in FIG. 12K.

In S141483, the DKA 12 searches the first table 211 of the DP-VOL management table 210 for a PSCB# of dirty data, where the LDEV# and the intra-LDEV address of the DP-LDEV 203 match each other.

In S141484, the DKA 12 stores "0" in the number of links 2126 of the found PSCB# of the DP-VOL management table 210.

In S141485, the DKA 12 releases the found PSCB# (PSCB# of dirty data) from the used queue and updates the content of the used queue management table 410 into the content after the release.

In S141486, the DKA 12 stores the PSCB# released in S141484 in the end PSCB# of the free queue management table 420, and connects the released PSCB# to the free queue.

In S141487, the DKA 12 searches the first table 211 of the DP-VOL management table 210 for a PSCB# of clean data where the LDEV# and the intra-LDEV address of the DP-LDEV 203 match each other.

In S141488, the DKA 12 increments by 1 the number of links 2126 of the found PSCB# (PSCB# of clean data) in the DP-VOL management table 210.

In S141489, the DKA 12 stores the PSCB# of clean data, which corresponds to the PSCB# of dirty data, in the PSCB#2113 of the first table 211 of the DP-VOL management table 210 (see FIG. 11A).

As described so far, when destaging dirty data from the CM 13, the DKA 12 compares the content of dirty data with that of clean data before storing dirty data in the storage device 15 (S14147). Then, if both match each other (S14147: YES), the DKA 12 executes a redundancy elimination processing S14148 to discard the content of dirty data (performs no writing to the storage device 15). Then, the DKA 12 changes the content of the DP-VOL management table 210 such that dirty data and clean data share a SLCB as well as the PSCB found by reverse lookup of the SLCB (i.e. increments the number of links (S141488)).

Note that the redundancy elimination processing S14148 may be executed, for example, at the time of execution of a clean queue cutting processing S12222 illustrated in FIGS. 12C and 12E. In the clean data cutting processing S12222, redundancy elimination of clean data may be performed by the same algorithm as that of the redundancy elimination processing S14148.

In a case where redundancy elimination of clean data is thus performed, a priority order of clean data cutting may be decided according to the degree of redundancy of each clean data.

Moreover, in a case where an algorithm is employed in which a priority order of clean data cutting with reference to both a time stamp and degree of redundancy of clean data, the priority order of clean data cutting may be decided with a priority placed on judgment of degree of redundancy (rather than the order of time stamps).

The above embodiment has been explained to facilitate understanding of the present invention, and it should be noted that the embodiment does not limit the present invention. The present invention can be changed and modified without departing from the scope of the invention. In addition, the invention includes the equivalents thereof.

The invention claimed is:

1. A storage apparatus comprising:
a channel control unit that receives an I/O request to a storage device from an external device;
a storage device control unit that writes or reads data to or from the storage device;
a cache memory accessible from the channel control unit and the storage device control unit;
an I/O processing unit that causes the storage device control unit to write or read data in response to the I/O request received by the channel control unit;
a real logical device management unit that provides a real logical device which is a logical device configured of a storage area of the storage device; and
a virtual logical device management unit that provides a virtual logical device which is a virtual logical device configured of a storage area of the real logical device, in a dynamic provisioning system, wherein
the real logical device management unit manages the storage area of the real logical device by dividing the storage area into unit cache areas, which are predetermined management units of storage area of the cache memory,
the virtual logical device management unit manages the storage area of the virtual logical device by dividing the storage area into virtual unit areas, which are predetermined management units,
the I/O processing unit manages data stored in the storage device by establishing correspondence between one of the unit cache areas and a plurality of the virtual unit areas having the same data stored therein,
if data of one of the unit cache areas with destage uncompleted in the cache memory is the same as data of a unit cache area with destage completed in the cache memory, the I/O processing unit establishes correspondence between one of the unit cache areas and a plurality of the virtual unit areas having the same data stored therein by causing only the data of the unit cache area with destage completed to remain in the cache memory and then making the unit cache area of the remaining data correspond to the plurality of virtual unit areas,
the I/O processing unit manages the number of the virtual unit areas which are made to correspond to the unit cache area as a number of links, and
if no unused storage area exists in the cache memory but a plurality of storage areas with destage completed exist in the cache memory at the time of storing data in the cache memory, reserves a storage area in the cache memory for storing the data by releasing the storage area corresponding to the unit cache area having the least number of links.

2. The storage apparatus according to claim 1, wherein when receiving the I/O request, the I/O processing unit allocates the virtual unit area and the unit cache area for a processing in response to the I/O request, and stores data transmitted and received between the channel control unit and the storage device control unit in response to the I/O request, in the storage area of the cache memory corresponding to the allocated unit cache area.

3. The storage apparatus according to claim 2, wherein the I/O processing unit
manages the number of virtual unit areas which are made to correspond to the unit cache area as the number of links;
when the I/O request is a data write request to the storage device, reads data stored in an area of a write destination of the write request from the storage device, and stores the read data in the storage area of the cache memory corresponding to the allocated real unit area,
stores write data of the write request in the storage area of the cache memory corresponding to the allocated real unit area if the number of links is 0, and
allocates a new virtual unit area and a new unit cache area, and stores the write data of the write request in the storage area of the cache memory corresponding to the newly allocated unit cache area if the number of links is not 0.

4. The storage apparatus according to claim 2, wherein when the I/O request is a data read request to the storage device, the I/O processing unit reads data stored in an area of a read destination of the read request from the storage device and stores the read data in the storage area of the cache memory corresponding to the allocated real unit area.

5. A method for eliminating redundant data storage using a storage apparatus that comprises a channel control unit that receives an I/O request to a storage device from an external device; a storage device control unit that writes or reads data to or from the storage device; a cache memory accessible from the channel control unit and the storage device control unit; an I/O processing unit that causes the storage device control unit to write or read data in response to the I/O request received by the channel control unit; a real logical device management unit that provides a real logical device which is a logical device configured of a storage area of the storage device; and a virtual logical device management unit that provides a virtual logical device which is a virtual logical device configured of a storage area of the real logical device, in a dynamic provisioning system, the method comprising:

managing the storage area of the real logical device by dividing the storage area into unit cache areas, which are predetermined management units of storage area of the cache memory;

managing the storage area of the virtual logical device by dividing the storage area into virtual unit areas, which are predetermined management units; and managing data stored in the storage device by establishing correspondence between one of the unit cache areas and a plurality of the virtual unit areas having the same data stored therein, wherein if data of the one of unit cache areas with destage uncompleted in the cache memory is the same as data of a unit cache area with destage completed in the cache memory, the I/O processing unit establishes correspondence between one of the unit cache areas and a plurality of the virtual unit areas having the same data stored therein comprises causing only the data of the unit cache area with destage completed to remain in the cache memory and then making the unit cache area of the remaining data correspond to the plurality of virtual unit areas, a number of the virtual unit areas which are made to correspond to the unit cache area are managed as a number of links, and if no unused storage area exists in the cache memory but a plurality of storage areas with destage completed exist in the cache memory at the time of storing data in the cache memory, reserves a storage area in the cache memory for storing the data by releasing the storage area corresponding to the unit cache area having the least number of links.

6. The method according to claim 5, wherein when receiving the I/O request, the I/O processing unit allocates the virtual unit area and the unit cache area for a processing in response to the I/O request, and stores data transmitted and received between the channel control unit and the storage device control unit in response to the I/O request, in the storage area of the cache memory corresponding to the allocated unit cache area.

7. The method according to claim 6, wherein the I/O processing unit: manages the number of virtual unit areas which are made to correspond to the unit cache area as the number of links; when the I/O request is a data write request to the storage device, reads data stored in an area of a write destination of the write request from the storage device and stores the read data in the storage area of the cache memory corresponding to the allocated real unit area; stores write data of the write request in the storage area of the cache memory corresponding to the allocated real unit area if the number of links is 0; and allocates a new virtual unit area and a new unit cache area and stores the write data of the write request in the storage area of the cache memory corresponding to the newly allocated unit cache area if the number of links is not 0.

8. The method according to claim 6, wherein when the I/O request is a data read request to the storage device, the I/O processing unit reads data stored in an area of a read destination of the read request from the storage device and stores the read data in the storage area of the cache memory corresponding to the allocated real unit area.

\* \* \* \* \*